United States Patent
Erceg et al.

(10) Patent No.: US 8,521,222 B2
(45) Date of Patent: *Aug. 27, 2013

(54) MULTISERVICE COMMUNICATION DEVICE WITH DEDICATED CONTROL CHANNEL

(75) Inventors: Vinko Erceg, Cardiff by the Sea, CA (US); John Walley, Ladera Ranch, CA (US); Arya Reza Behzad, Poway, CA (US); David Rosmann, Irvine, CA (US); Brima B. Ibrahim, Aliso Viejo, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/264,379

(22) Filed: Nov. 4, 2008

(65) Prior Publication Data

US 2010/0111033 A1    May 6, 2010

(51) Int. Cl.
*H04M 1/00* (2006.01)

(52) U.S. Cl.
USPC ......... 455/553.1; 455/436; 455/438; 455/444

(58) Field of Classification Search
USPC .............. 455/553.1, 436–444, 552.1
See application file for complete search history.

(56) References Cited

U.S. PATENT DOCUMENTS

| | | | |
|---|---|---|---|
| 5,321,847 A * | 6/1994 | Johnson, Jr. | 455/63.1 |
| 5,561,836 A * | 10/1996 | Sowles et al. | 455/428 |
| 7,308,263 B2 * | 12/2007 | Gallagher et al. | 455/439 |
| 7,418,245 B2 * | 8/2008 | Liu | 455/161.1 |
| 2005/0113128 A1 * | 5/2005 | Bahl et al. | 455/522 |
| 2006/0223515 A1 | 10/2006 | Hermel | |
| 2007/0026861 A1 | 2/2007 | Kuhn et al. | |
| 2007/0082632 A1 * | 4/2007 | Liu | 455/161.1 |
| 2008/0096560 A1 | 4/2008 | Felske et al. | |
| 2008/0240036 A1 * | 10/2008 | Liu et al. | 370/331 |

FOREIGN PATENT DOCUMENTS

| | | |
|---|---|---|
| CN | 1449636 A | 10/2003 |
| EP | 1404060 A2 | 12/2004 |
| WO | 0203733 A1 | 1/2002 |
| WO | 02/073366 A2 | 9/2002 |
| WO | 02073366 A2 | 9/2002 |
| WO | 2008109641 A2 | 9/2008 |

OTHER PUBLICATIONS

European Search Report; EP App. No. 09013489.1; Nov. 4, 2011; 3 pages.

(Continued)

*Primary Examiner* — Charles N. Appiah
*Assistant Examiner* — Jaime Holliday
(74) *Attorney, Agent, or Firm* — Garlick & Markison; Bruce E. Stuckman

(57) ABSTRACT

A multiservice communication device includes a plurality of transceivers that wirelessly transceive data with a corresponding plurality of networks in accordance with a corresponding plurality of network protocols. A control channel transceiver transceives control channel data with a remote management unit including local control data sent to the management unit and remote control data received from the management unit. A processing module processes the remote control data and generates a least one control signal in response thereto, the at least one control signal for adapting at least one of the plurality of transceivers based on the remote control data.

24 Claims, 34 Drawing Sheets

(56) References Cited

OTHER PUBLICATIONS

European Search Report; EP Application No. 09013490.9; May 10, 2011; 4 pages.

Office Action; CN Application No. 200910209877; Apr. 5, 2012; 6 pages.

Office Action; CN Application No. 200910212230; Apr. 6, 2012, 7 pages.

* cited by examiner

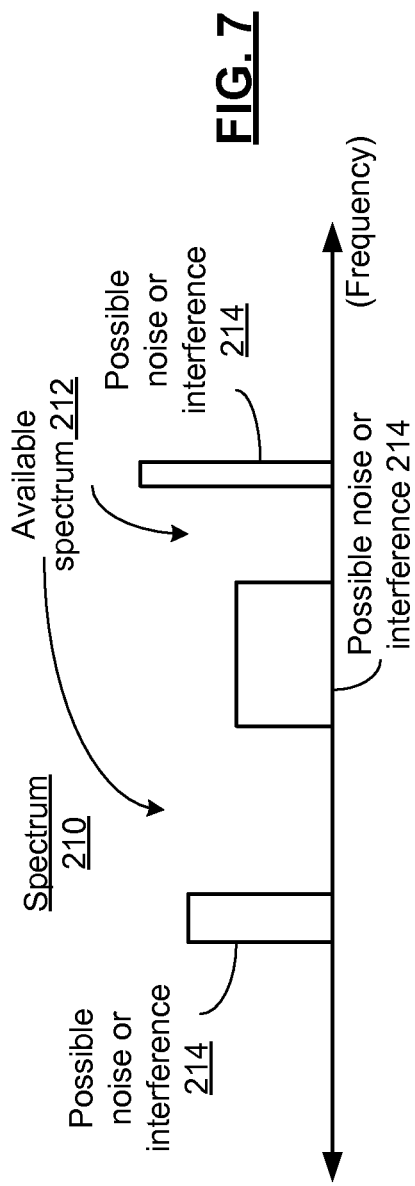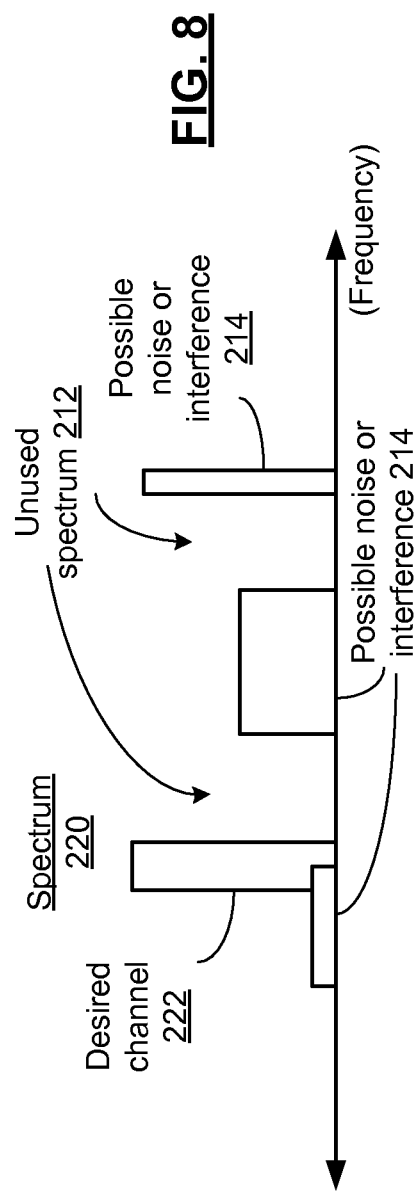

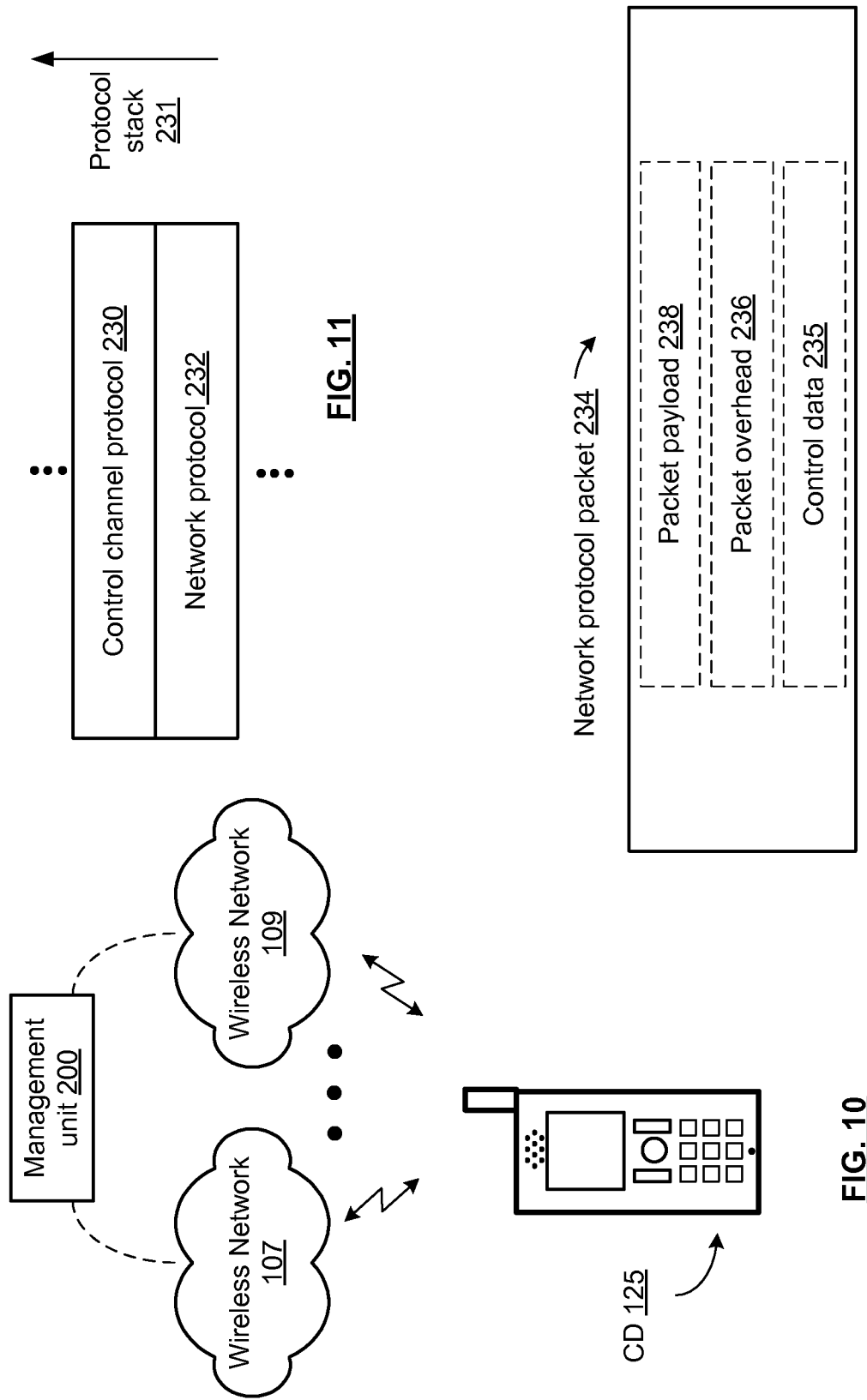

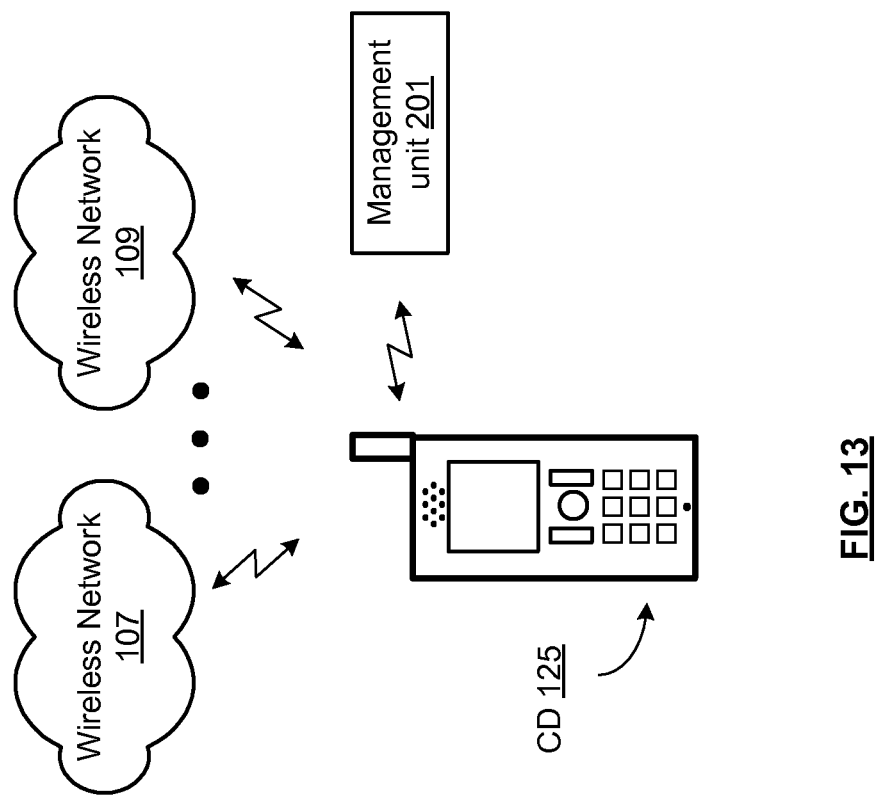

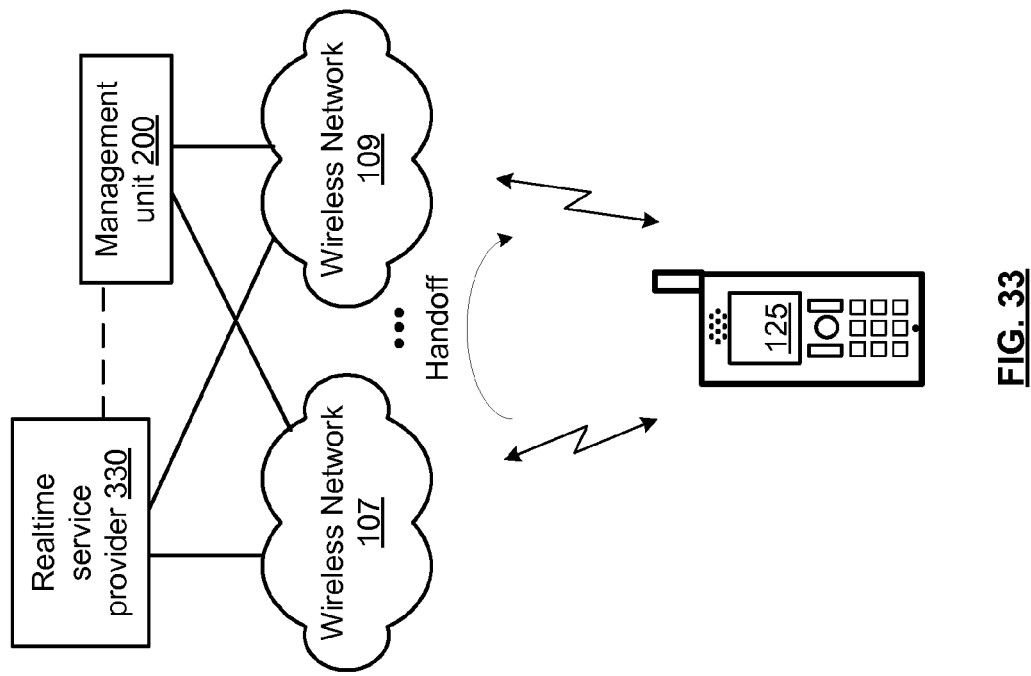
FIG. 33
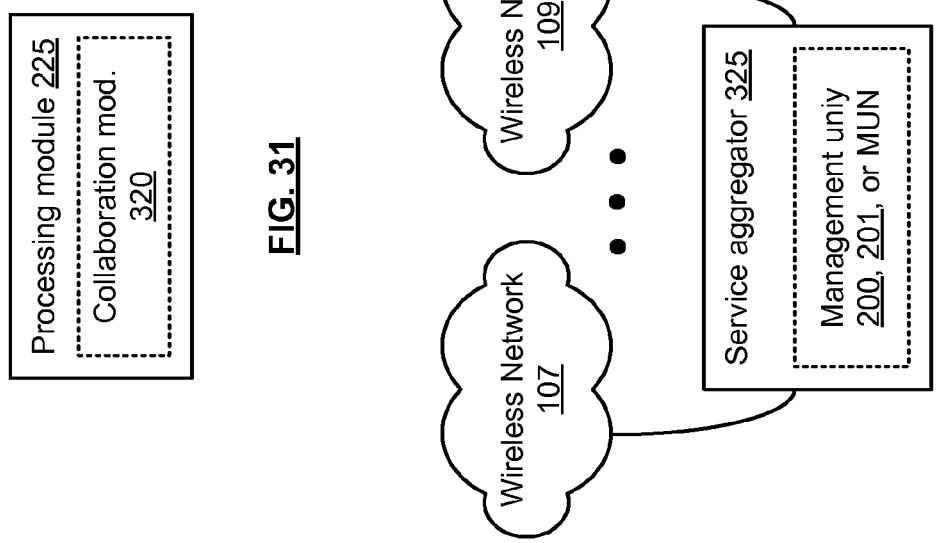
FIG. 31
FIG. 32

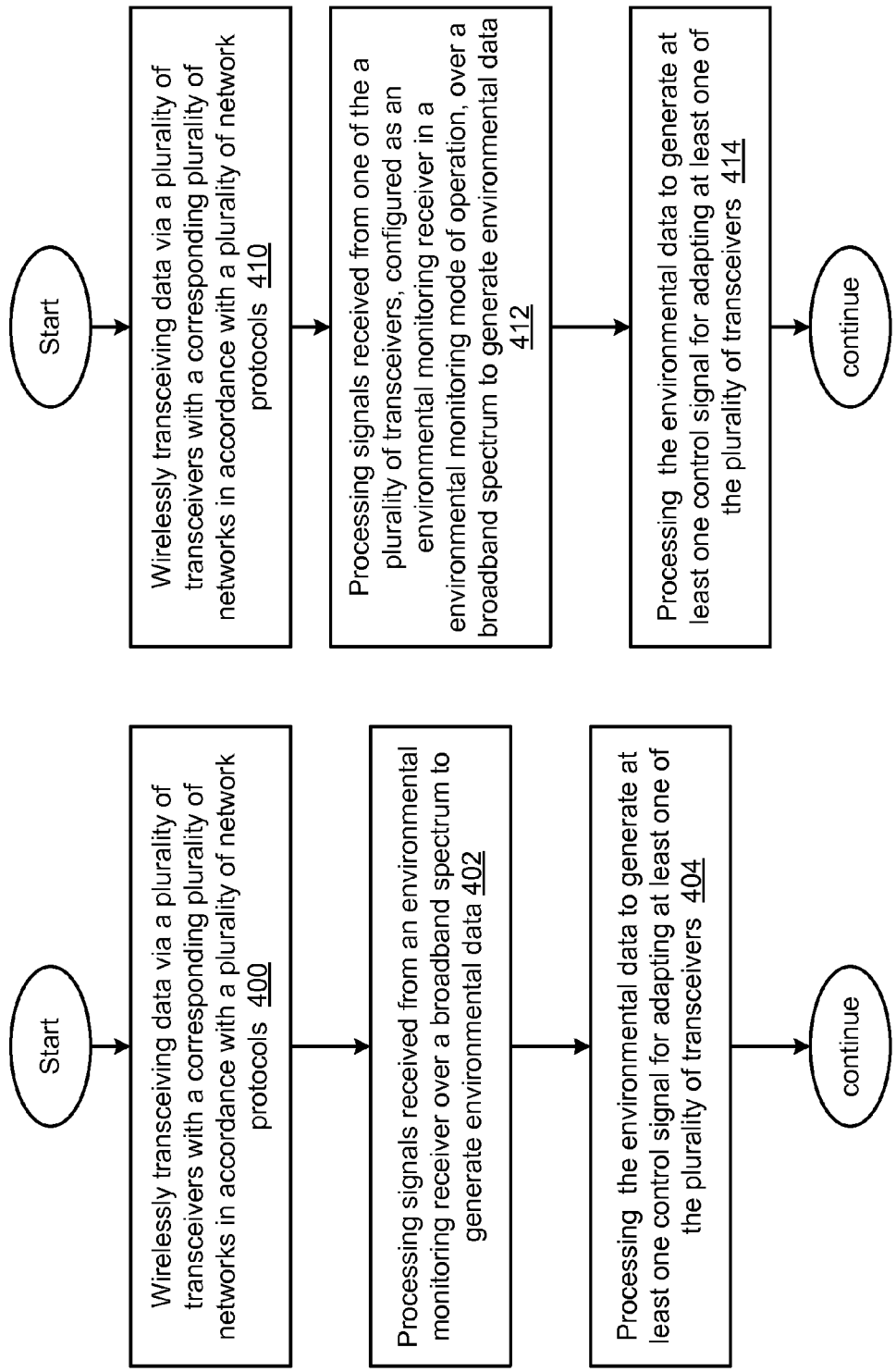

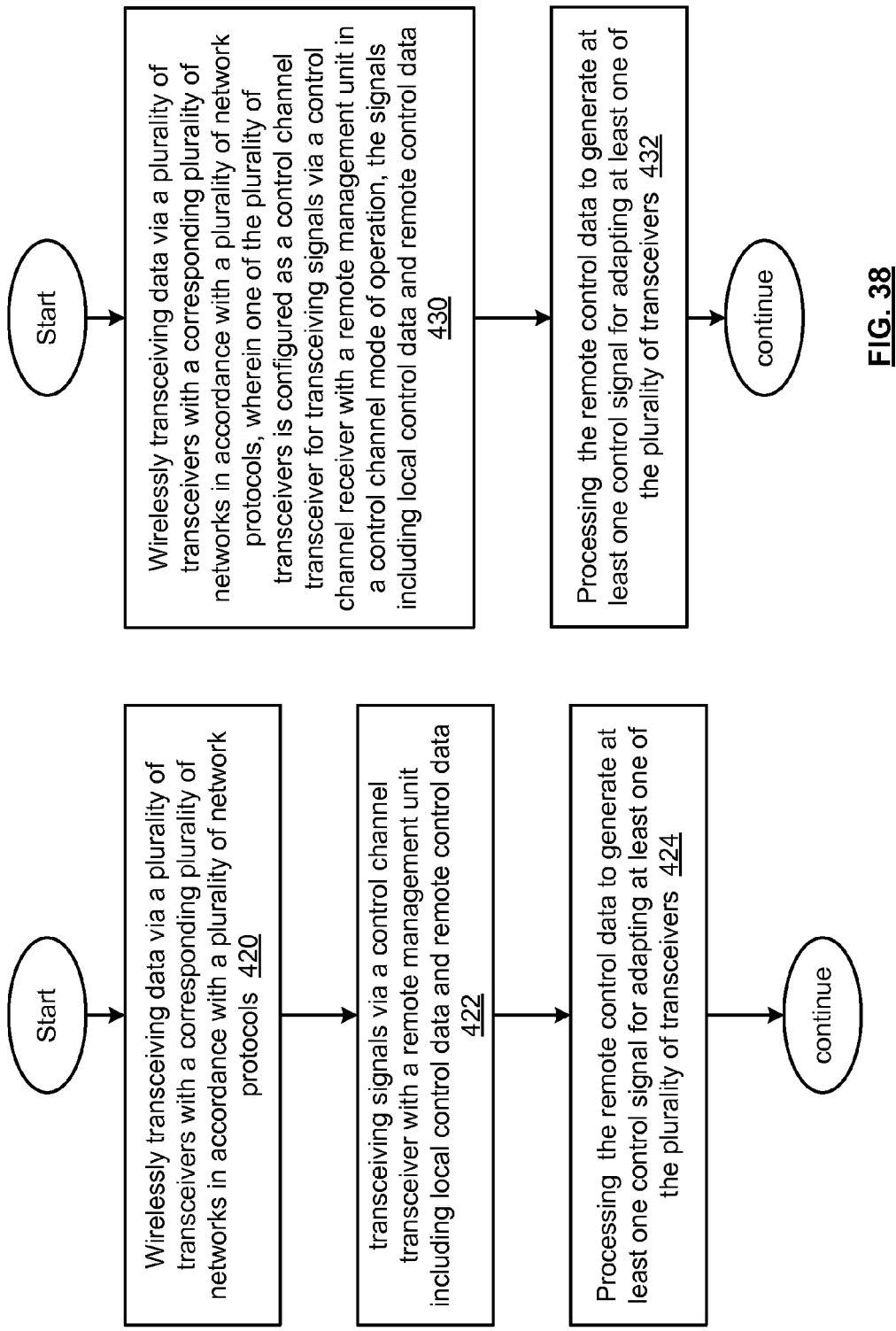

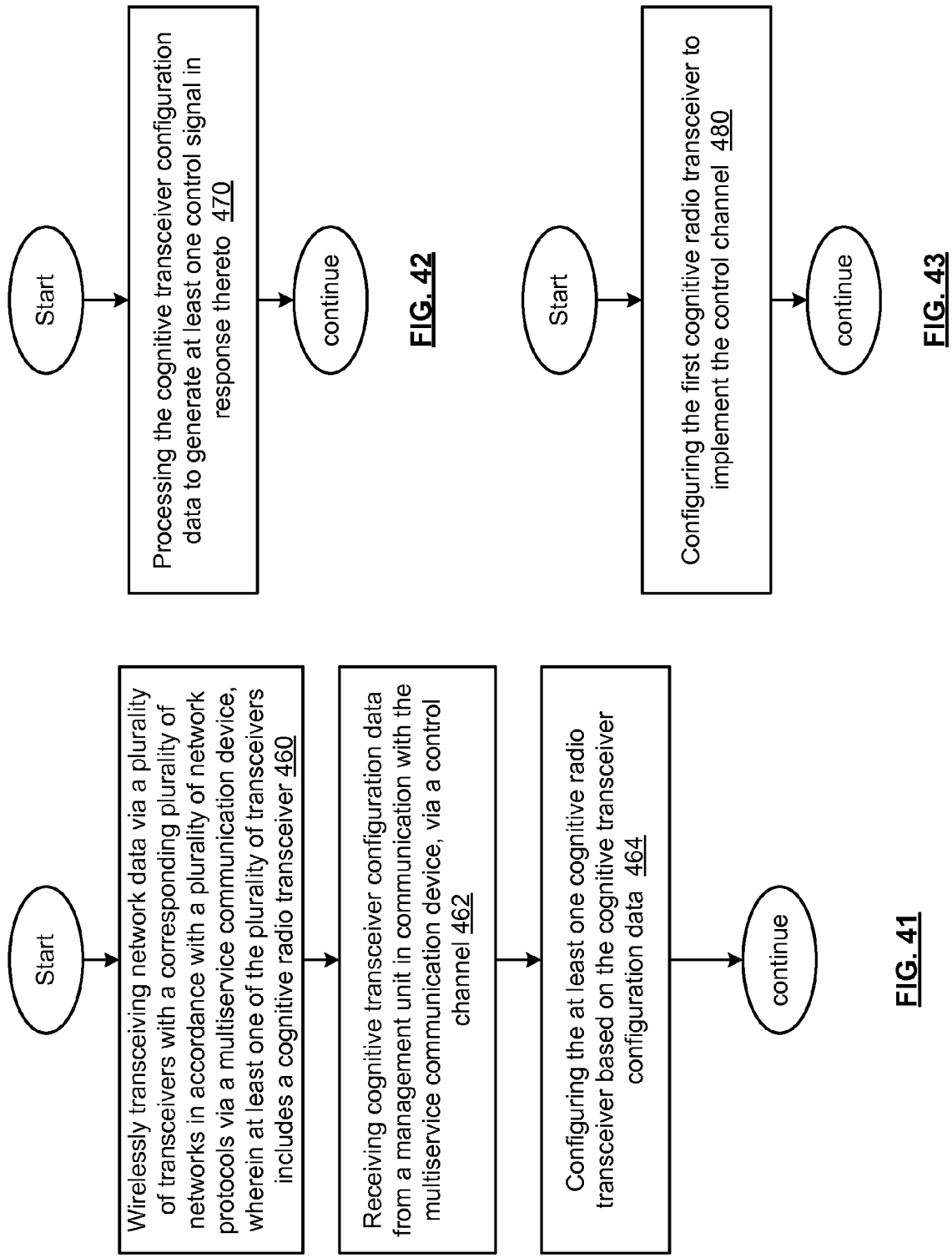

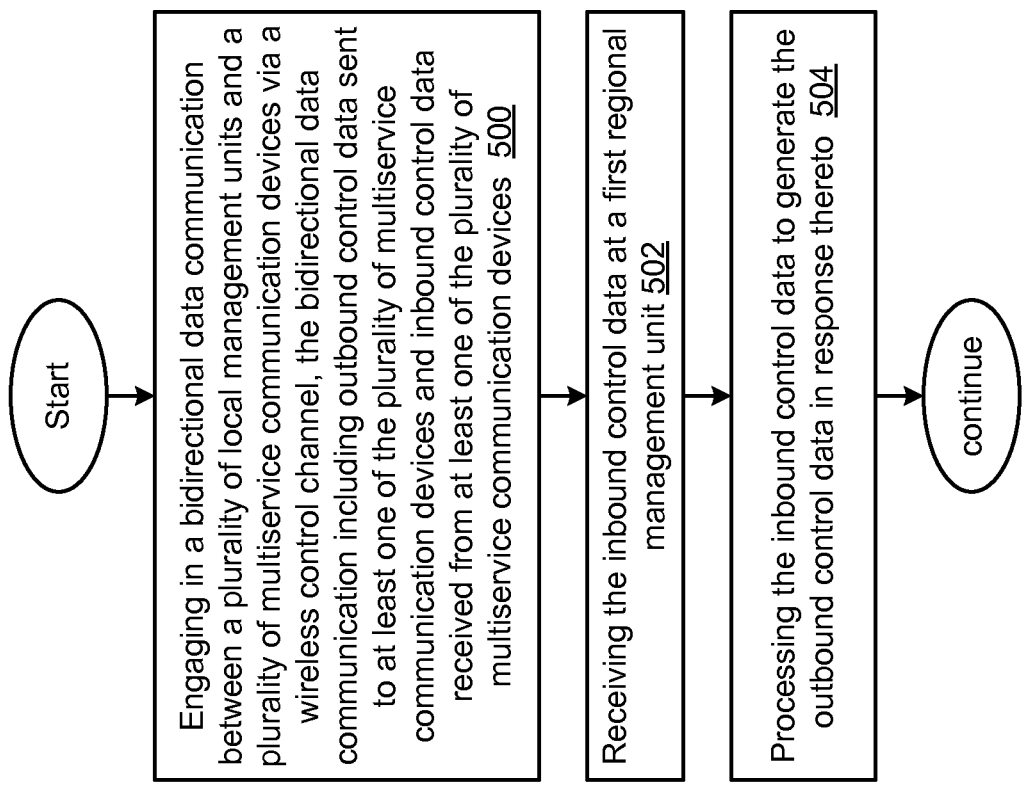
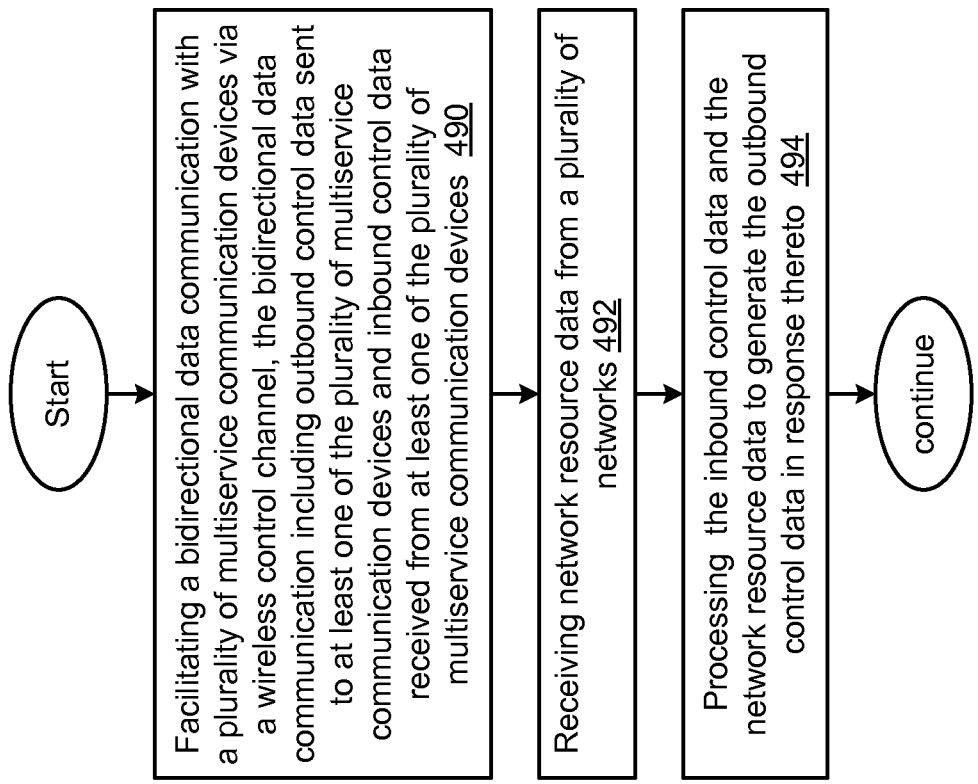

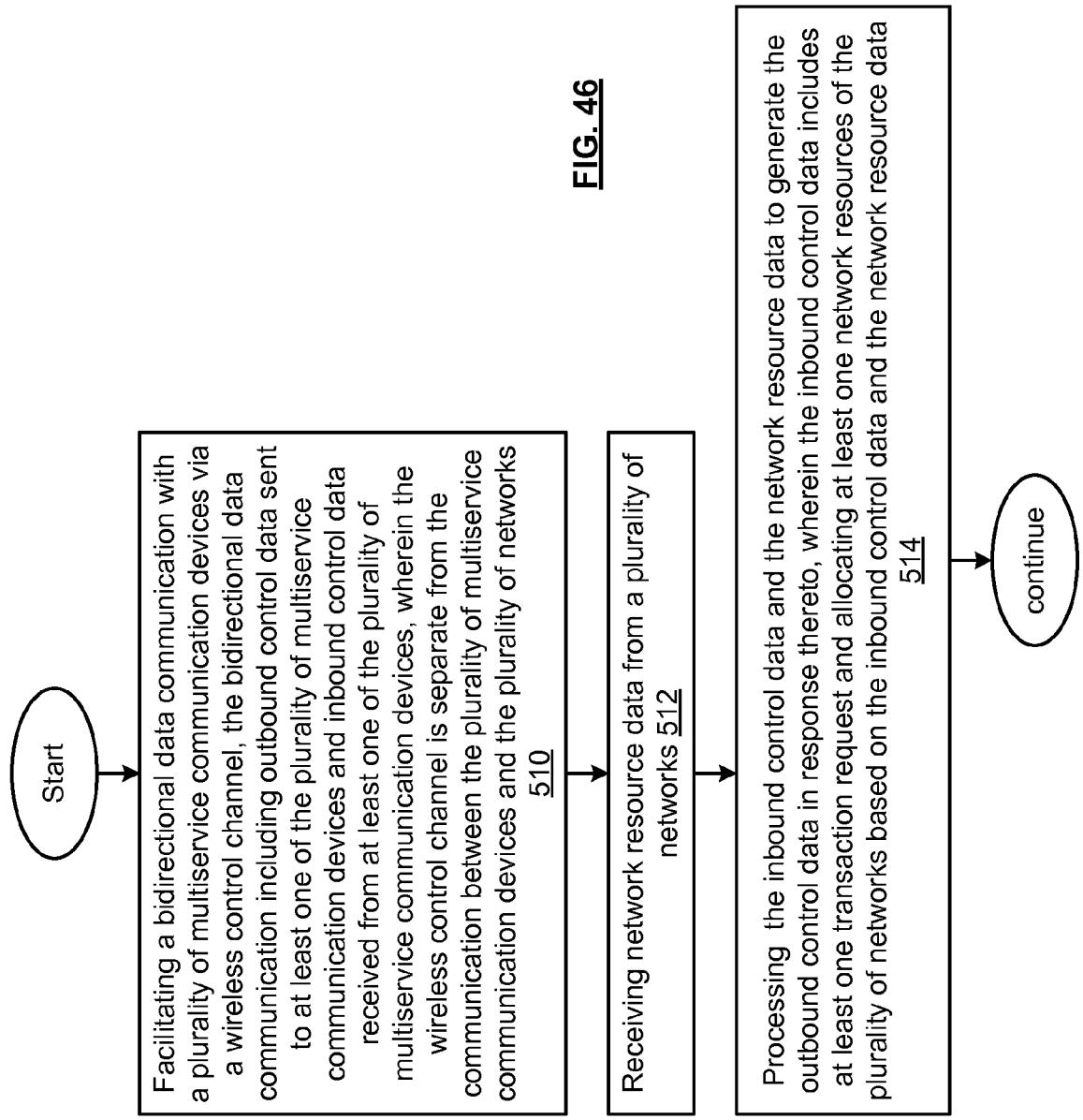

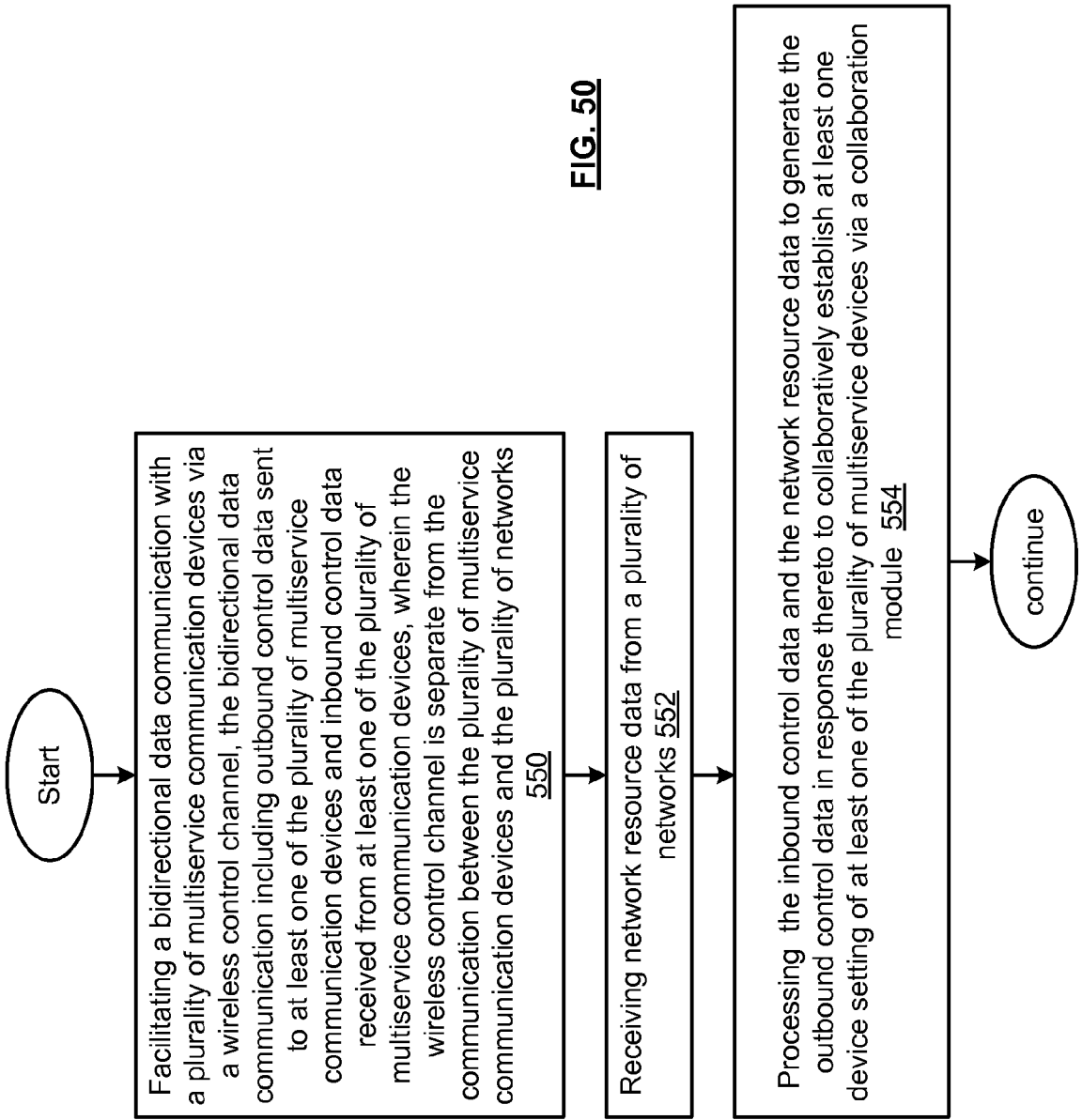

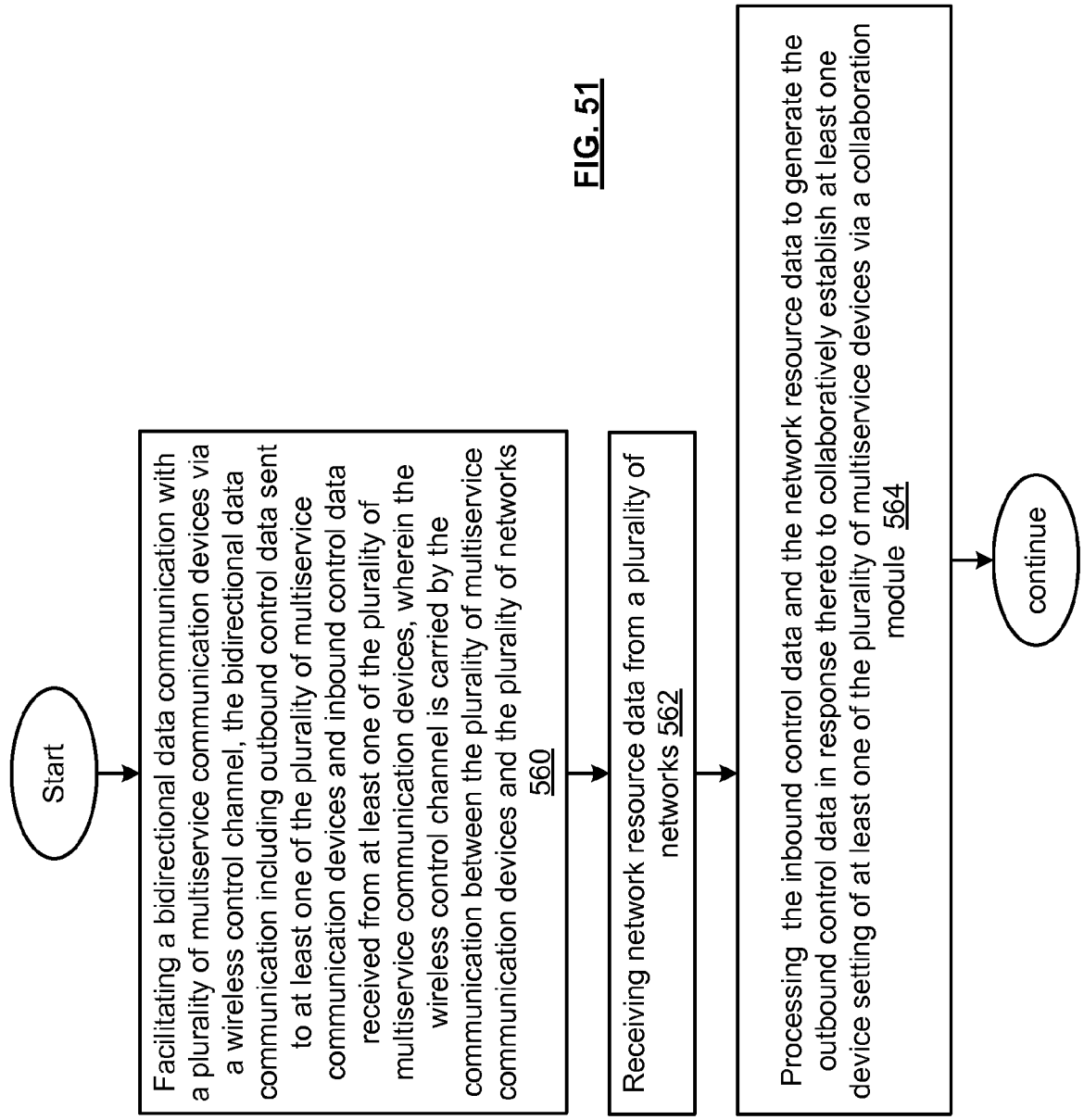

MULTISERVICE COMMUNICATION DEVICE WITH DEDICATED CONTROL CHANNEL

CROSS-REFERENCE TO RELATED APPLICATIONS

The present application is related to copending applications:

Ser. No. 12/264,372, entitled, MULTISERVICE COMMUNICATION DEVICE WITH DEDICATED ENVIRONMENTAL MONITORING, filed on Nov. 4, 2008;

Ser. No. 12/264,419, entitled, MULTISERVICE COMMUNICATION DEVICE WITH LOGICAL CONTROL CHANNEL, filed on Nov. 4, 2008, issued as U.S. Pat. No. 8,265,690 on Sep. 11, 2012;

Ser. No. 12/264,426, entitled, MULTISERVICE COMMUNICATION DEVICE WITH COGNITIVE RADIO TRANSCEIVER, filed on Nov. 4, 2008;

Ser. No. 12/264,434, entitled, MANAGEMENT UNIT FOR MANAGING A PLURALITY OF MULTISERVICE COMMUNICATION DEVICES, filed on Nov. 4, 2008, issued as U.S. Pat. No. 8,131,220 on Mar. 6, 2012;

Ser. No. 12/264,442, entitled, MANAGEMENT UNIT NETWORK FOR MANAGING A PLURALITY OF MULTISERVICE COMMUNICATION DEVICES, filed on Nov. 4, 2008;

Ser. No. 12/264,449, entitled, SERVICE AGGREGATOR FOR ALLOCATING RESOURCES TO A PLURALITY OF MULTISERVICE COMMUNICATION DEVICES, filed on Nov. 4, 2012, issued as U.S. Pat. No. 8,185,099 on May 22, 2012;

Ser. No. 11/264,454, entitled, MANAGEMENT UNIT FOR FACILITATING INTER-NETWORK HAND-OFF FOR A MULTISERVICE COMMUNICATION DEVICE, filed on Nov. 4, 2008, issued as U.S. Pat. No. 8,195,143 on Jun. 5, 2012;

Ser. No. 12/264,459, entitled, MANAGEMENT UNIT WITH LOCAL AGENT, filed on Nov. 4, 2008;

Ser. No. 12/264,472, entitled, MANAGEMENT UNIT NETWORK FOR COLLABORATIVELY MANAGING A PLURALITY OF MULTISERVICE COMMUNICATION DEVICES, filed on Nov. 4, 2008;

the contents of which are incorporated herein by reference thereto.

BACKGROUND OF THE INVENTION

1. Technical Field of the Invention

This invention relates generally to communication devices and more particularly to the communication devices that communicate with multiple networks in multiple frequency bands.

2. Description of Related Art

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, 802.15, 802.16, long term evolution (LTE), Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of client devices (e.g., laptops, personal computers, personal digital assistants, etc., coupled to a station) that communicate over a wireless link with one or more access points. As is also generally understood in the art, many wireless communications systems employ a carrier-sense multiple access (CSMA) protocol that allows multiple communication devices to share the same radio spectrum. Before a wireless communication device transmits, it "listens" to the wireless link to determine if the spectrum is in use by another station to avoid a potential data collision. In other systems, transmissions can be scheduled using management frames or power save multi-poll (PSMP), for example. In many cases, the transmitting device (e.g., a client device or access point) transmits at a fixed power level regardless of the distance between the transmitting device and a targeted device (e.g., station or access point). Typically, the closer the transmitting device is to the targeted device, the less error there will be in the reception of the transmitted signal.

A cognitive radio is a wireless communication device that can adjust transmission or reception parameters to communicate efficiently to avoiding interference. This alteration of parameters can be based on the active monitoring of several factors in the external and internal radio environment, such as radio frequency spectrum, user behavior and network state.

When one or more of these communication devices is mobile, its transmit and receive characteristics can change with the motion of the device, as it moves closer or farther from a device it is communication with, and as the transmission environment changes due to the devices position with respect to reflecting members, interfering stations, noise sources, etc.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 3:
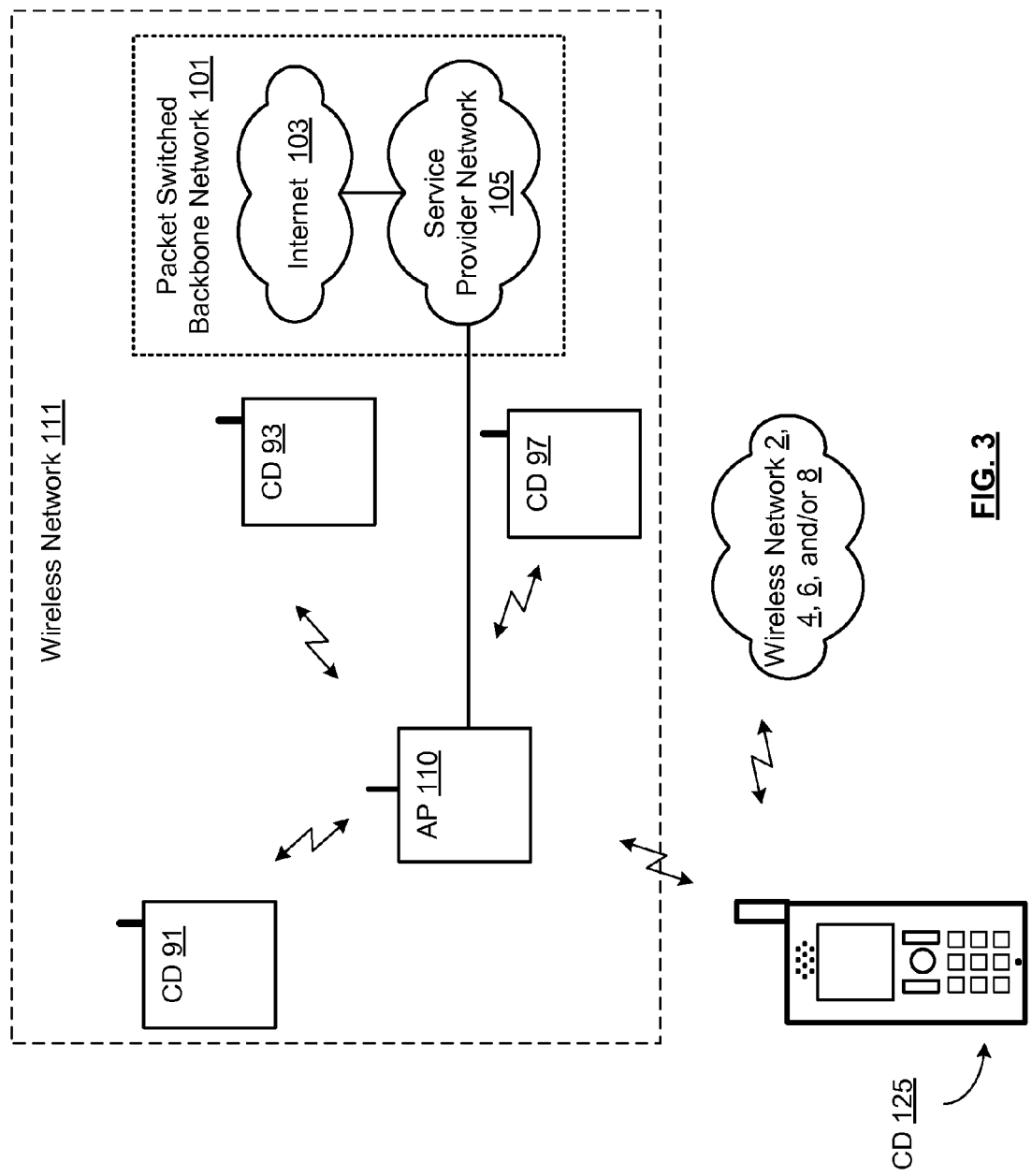

FIG. 3 presents a pictorial representation of a wireless network 111 in accordance with an embodiment of the present invention.

Figure 4:
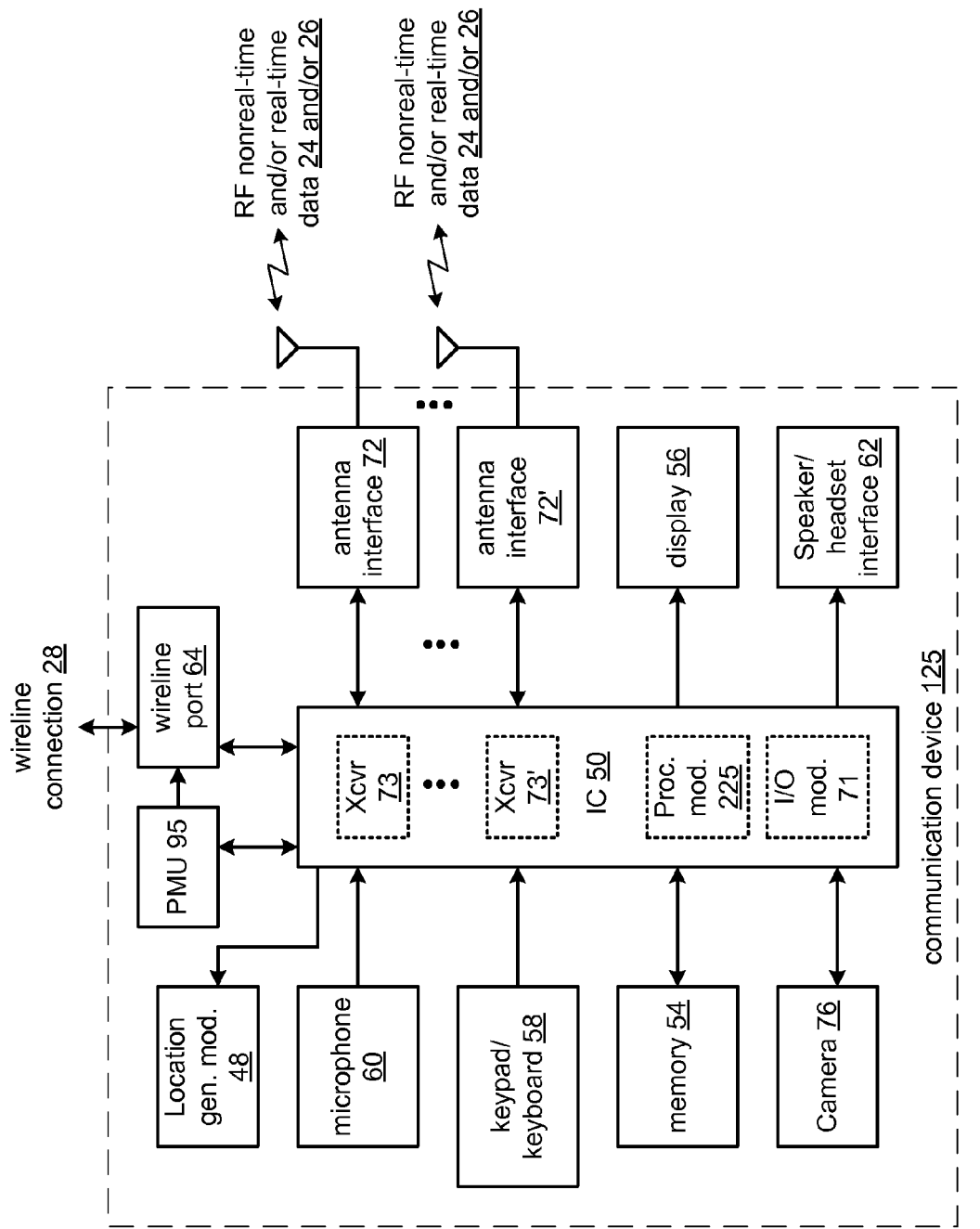
Figure 5:
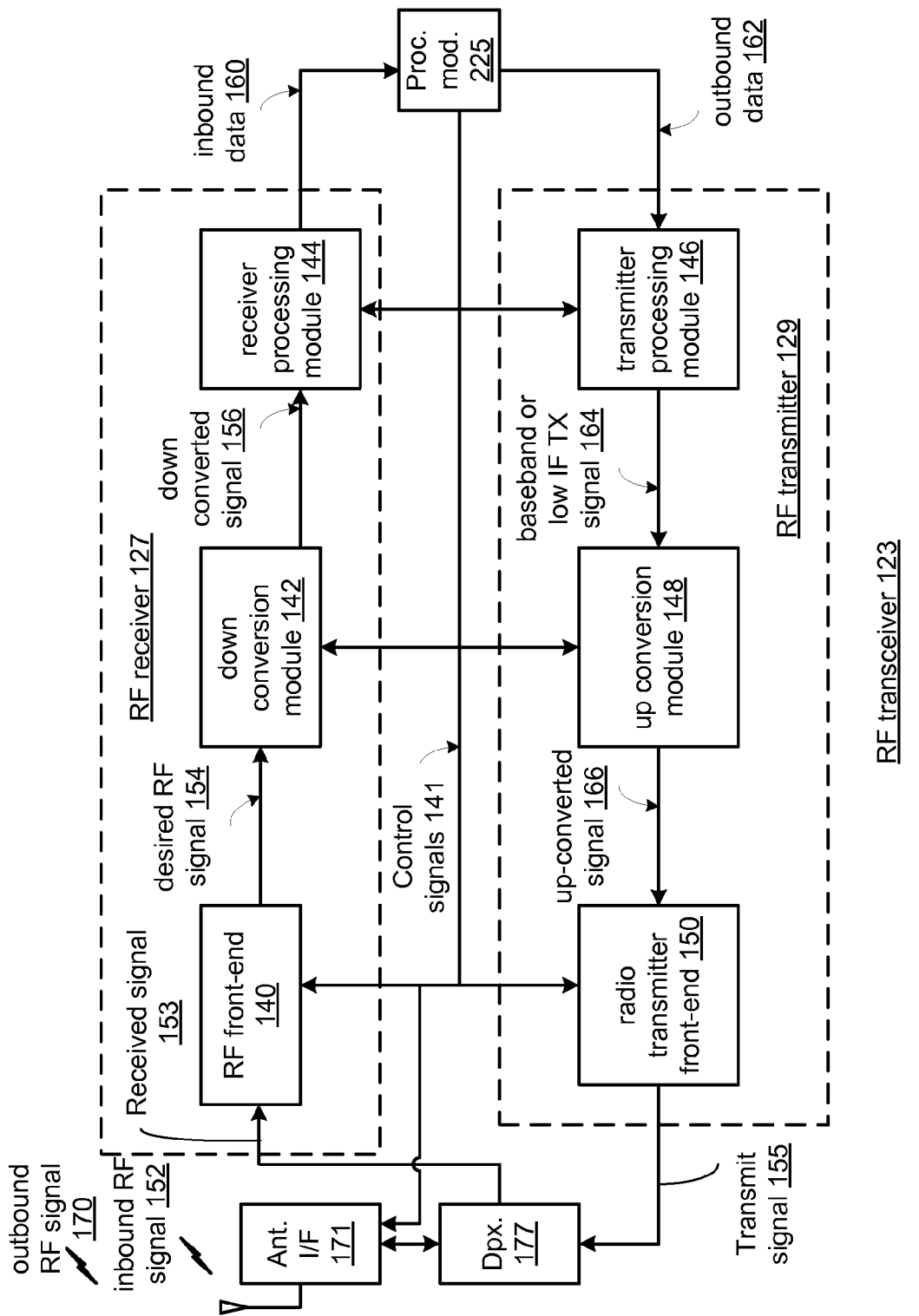
Figure 6:
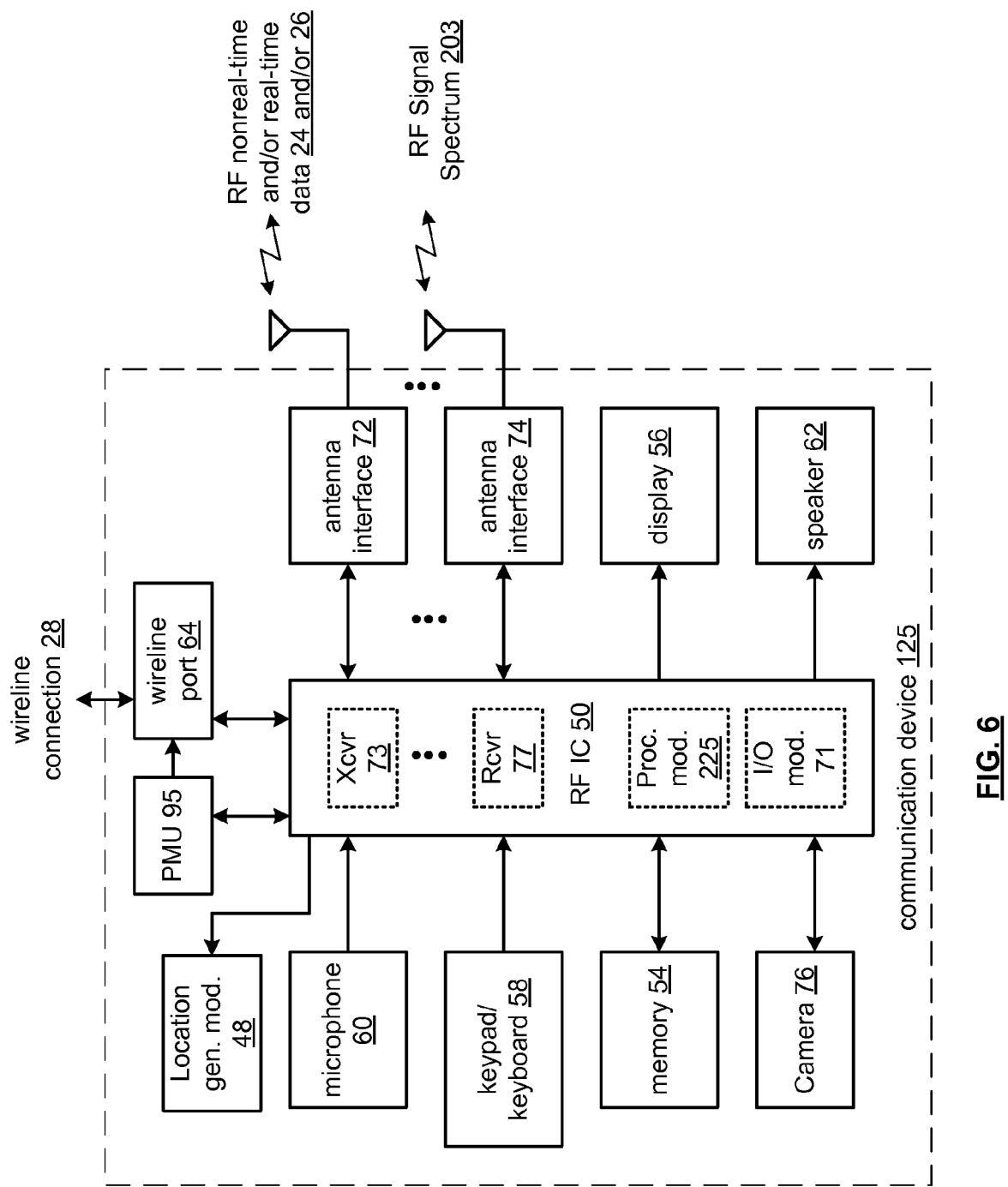

FIG. 4 is a schematic block diagram of an embodiment of a communication device 125 in accordance with the present invention;

FIG. 5 is a schematic block diagram of an embodiment of an RF transceiver 123 in accordance with the present invention;

FIG. 6 is a schematic block diagram of another embodiment of a communication device 125 in accordance with the present invention;

FIG. 7 is a graphical representation of a spectrum 210 in accordance with an embodiment of the present invention.

FIG. 8 is a graphical representation of a spectrum 220 in accordance with an embodiment of the present invention.

Figure 9:
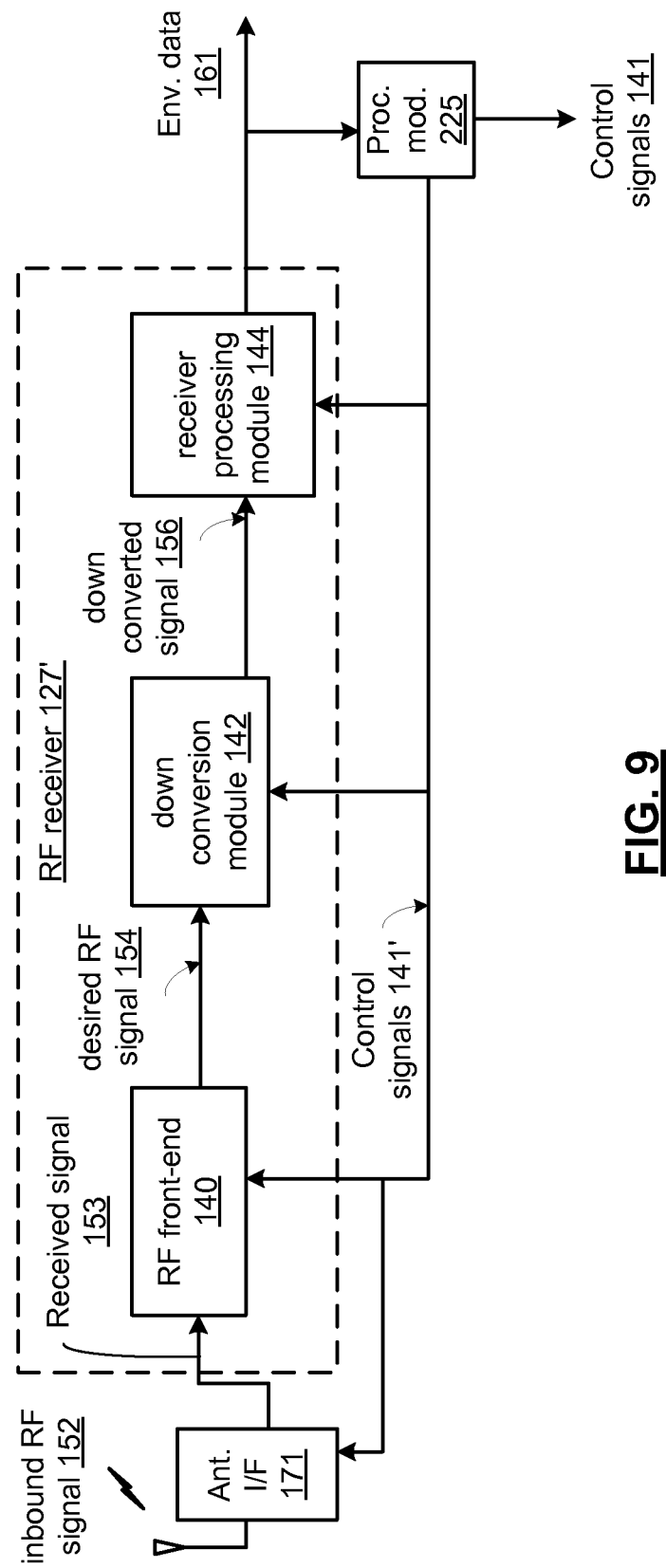

FIG. 9 is a schematic block diagram of an embodiment of an RF receiver 127' in accordance with the present invention;

FIG. 10 is a schematic block diagram of an embodiment of another communication system in accordance with the present invention;

FIG. 11 is a schematic block diagram representation of a portion of a protocol stack in accordance with an embodiment of the present invention.

FIG. 12 is a schematic block diagram representation of network protocol packet in accordance with an embodiment of the present invention.

Figure 14:
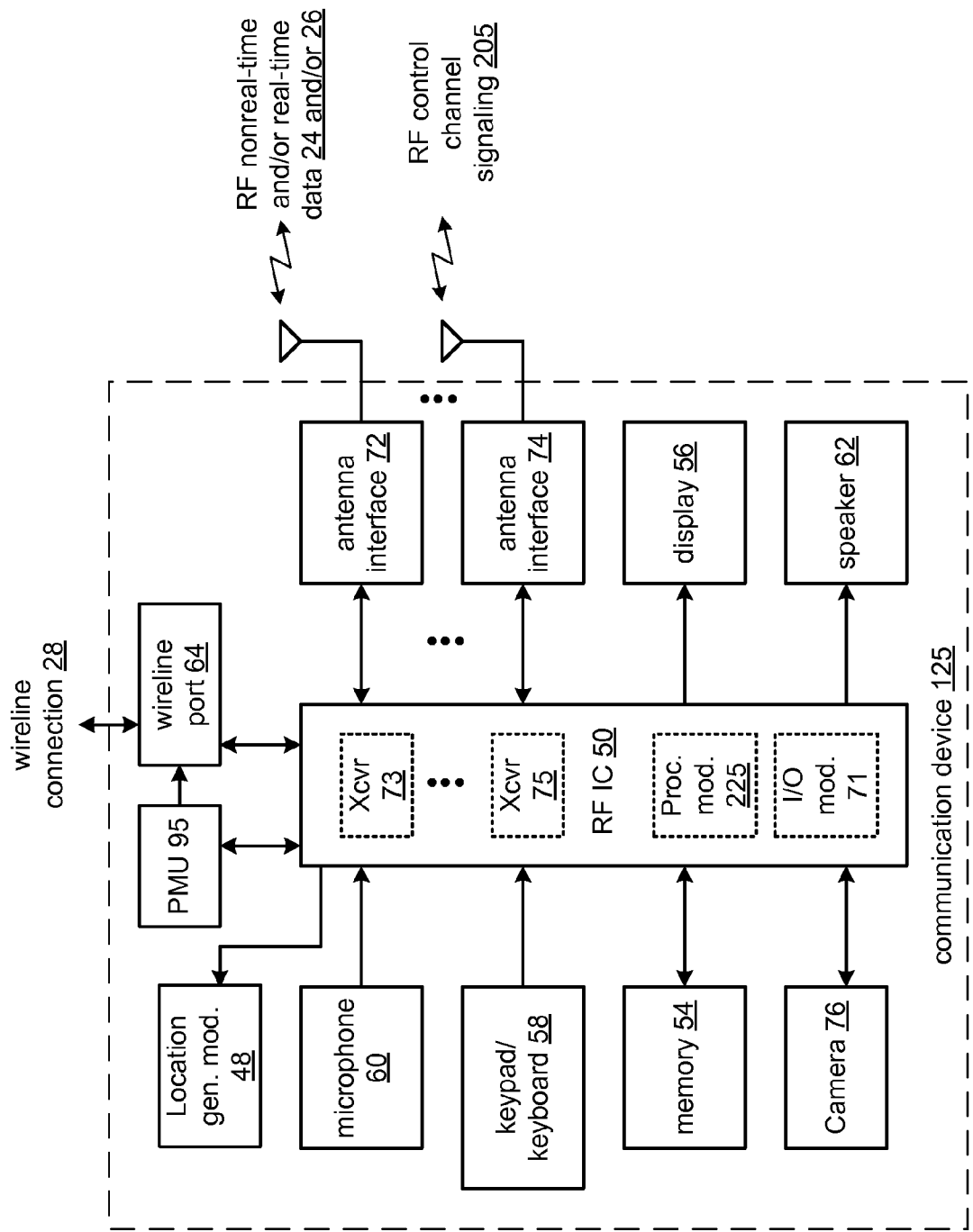
Figure 15:
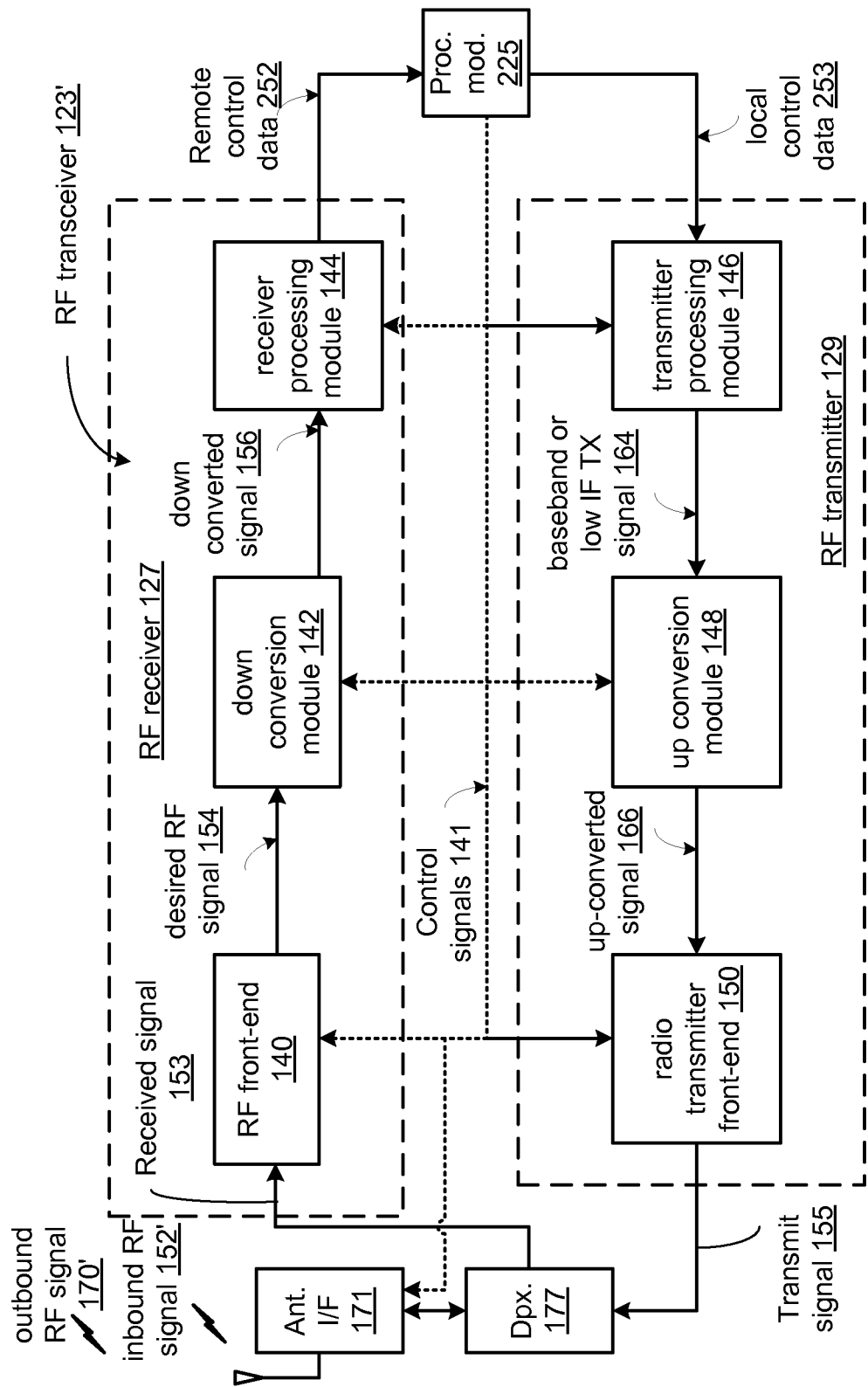
Figure 17:
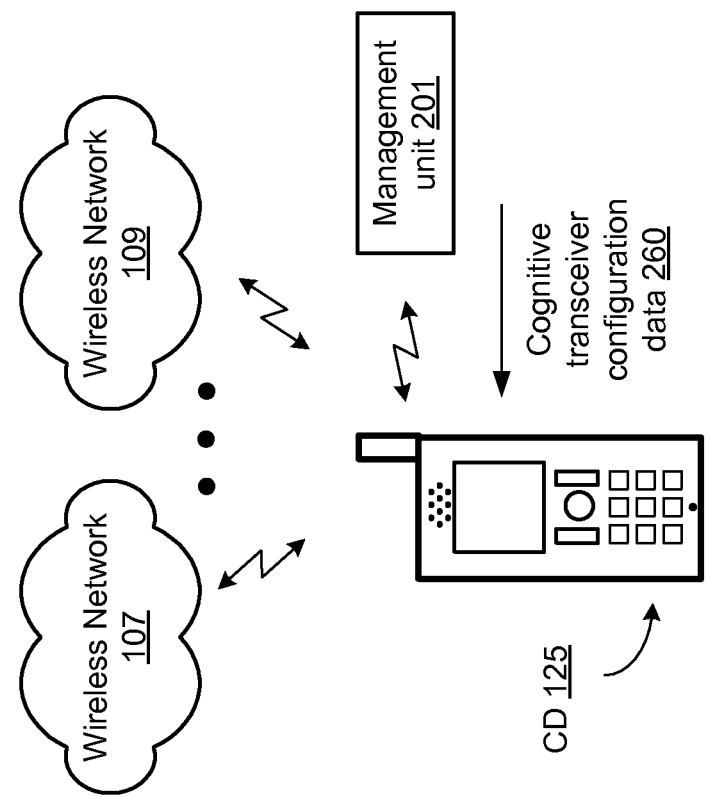
Figure 16:
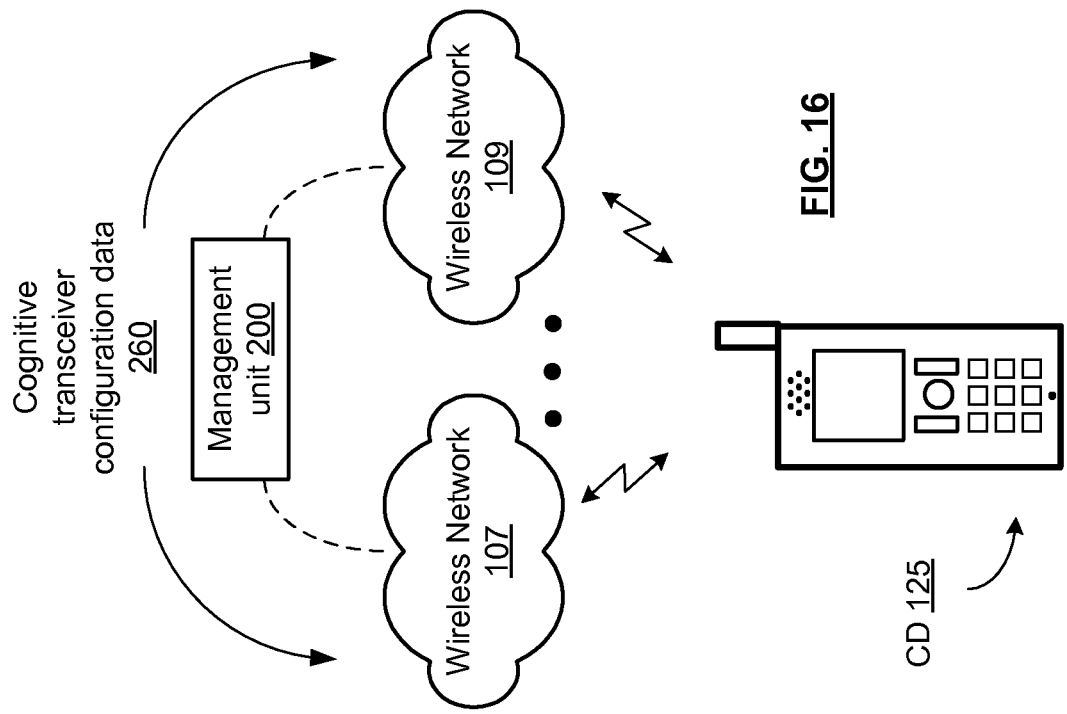
Figure 18:
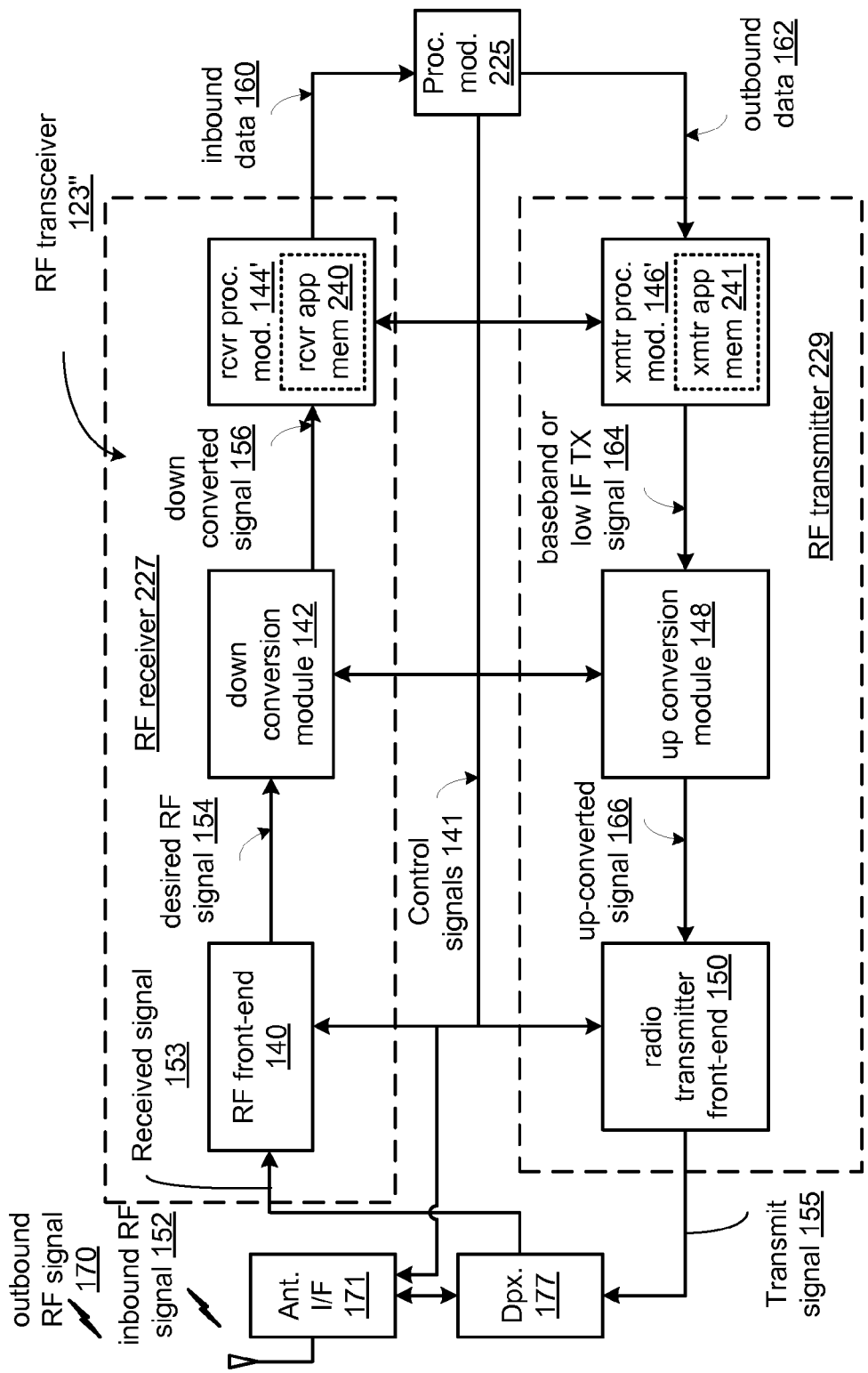
Figure 19:
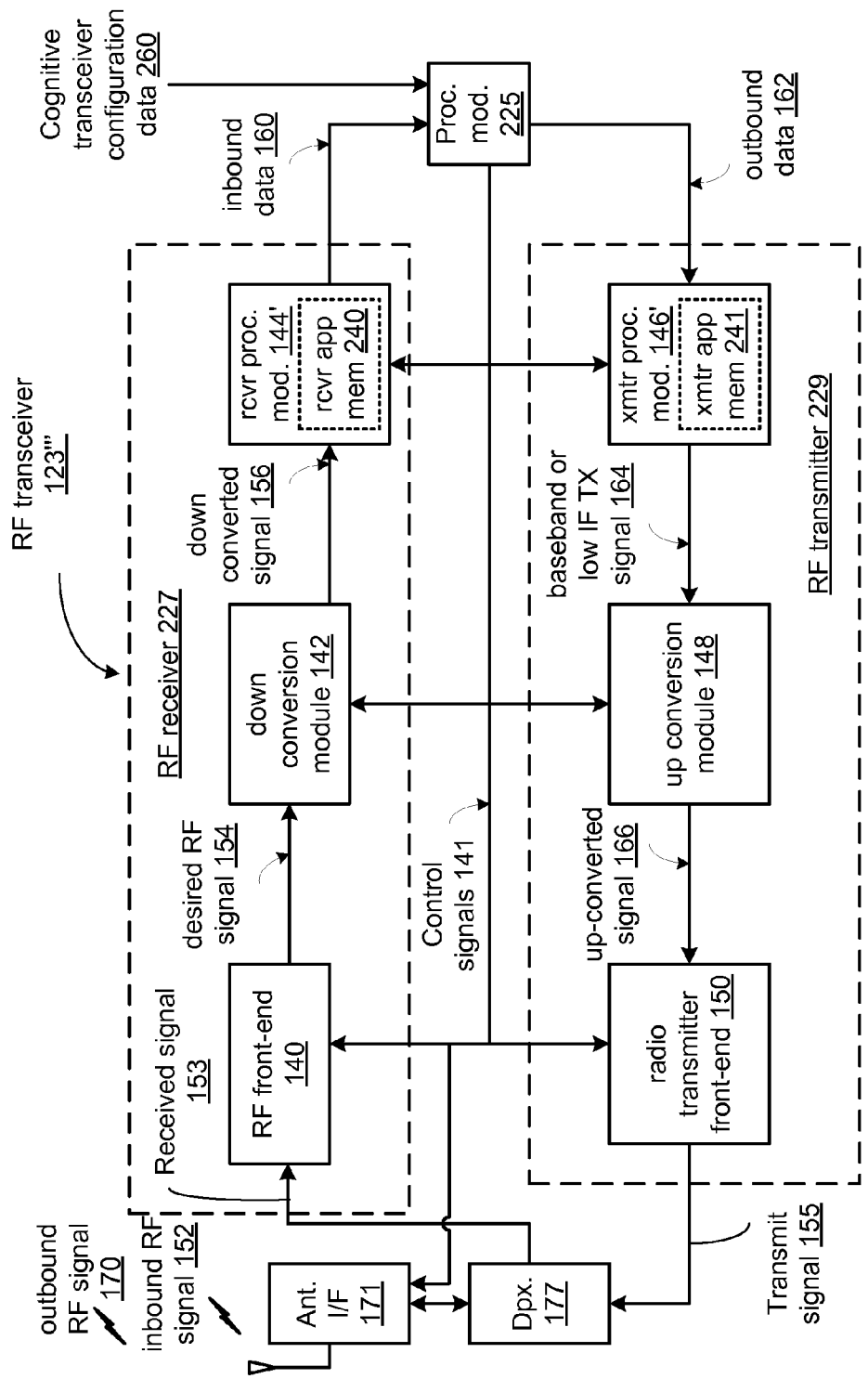
Figure 21:
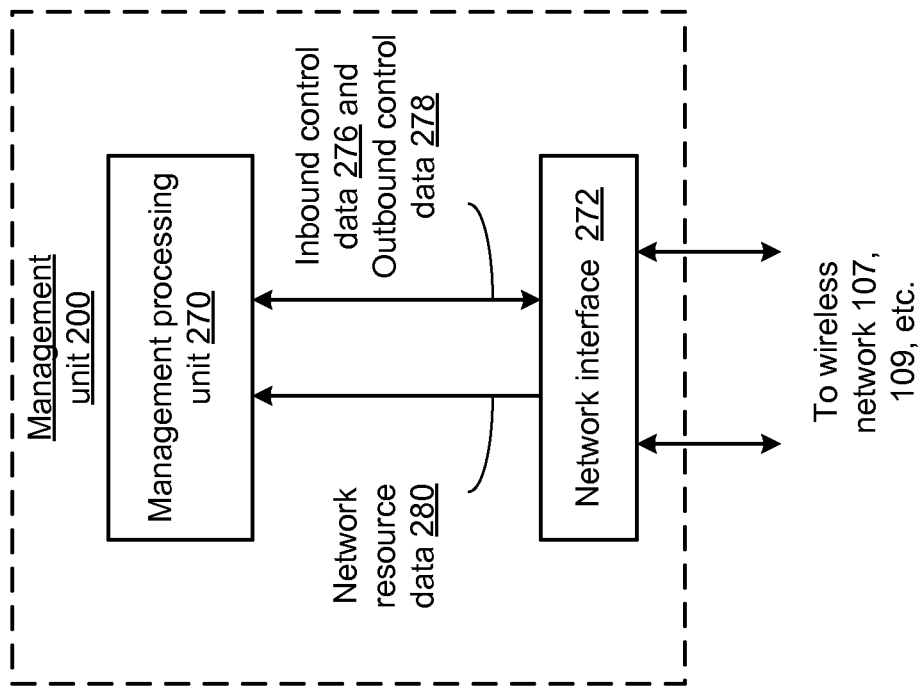
Figure 20:
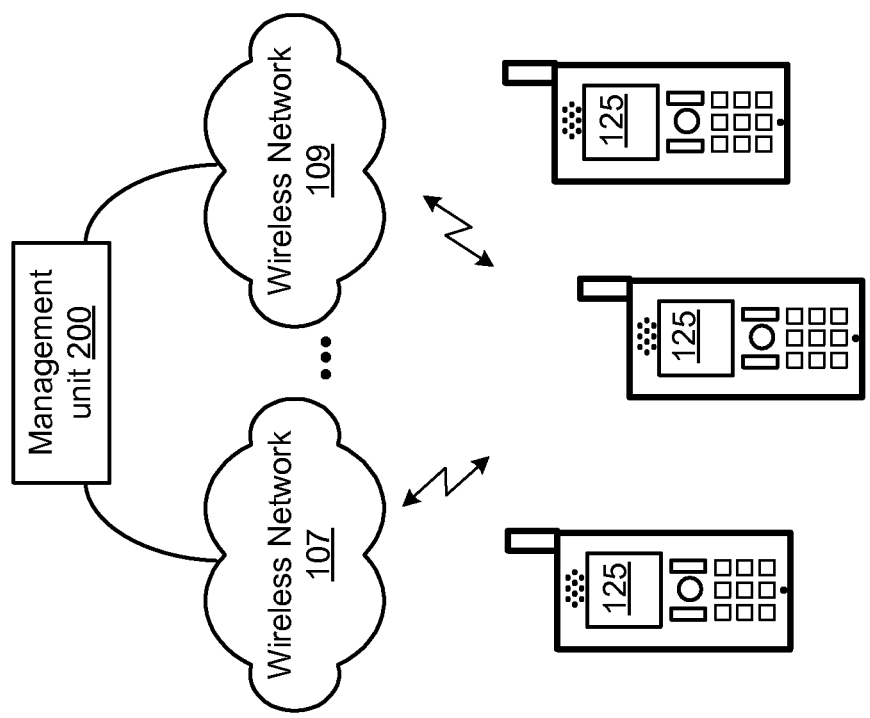
Figure 23:
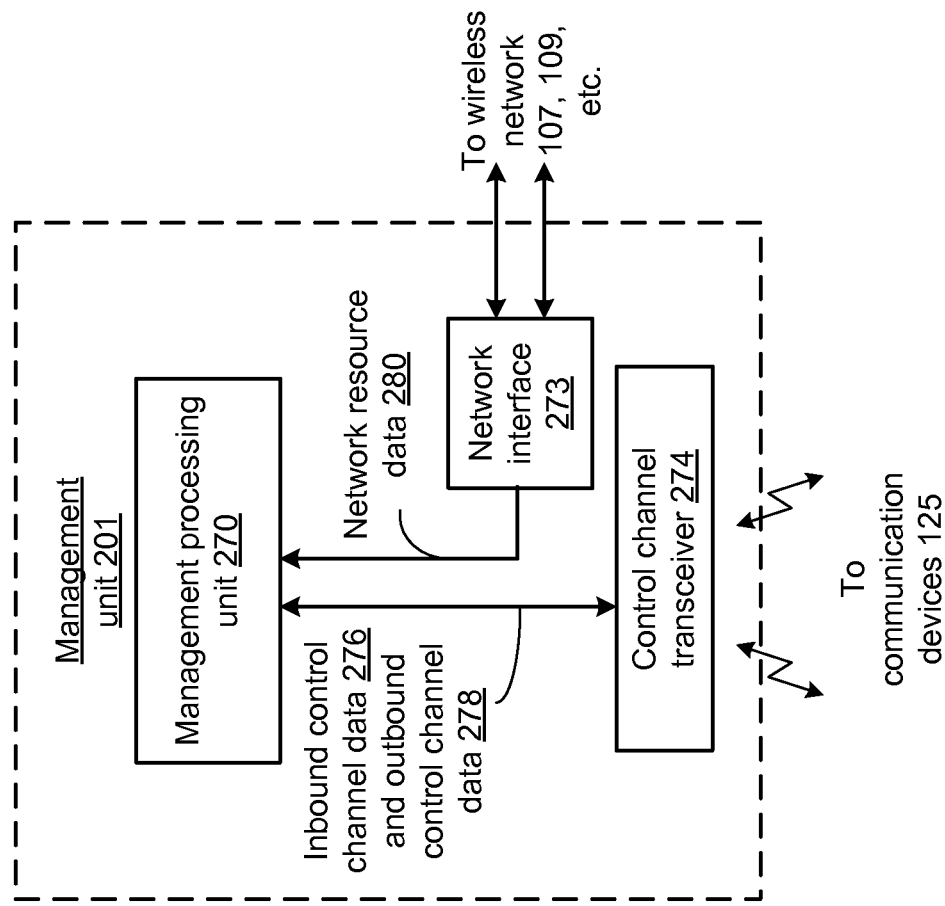
Figure 22:
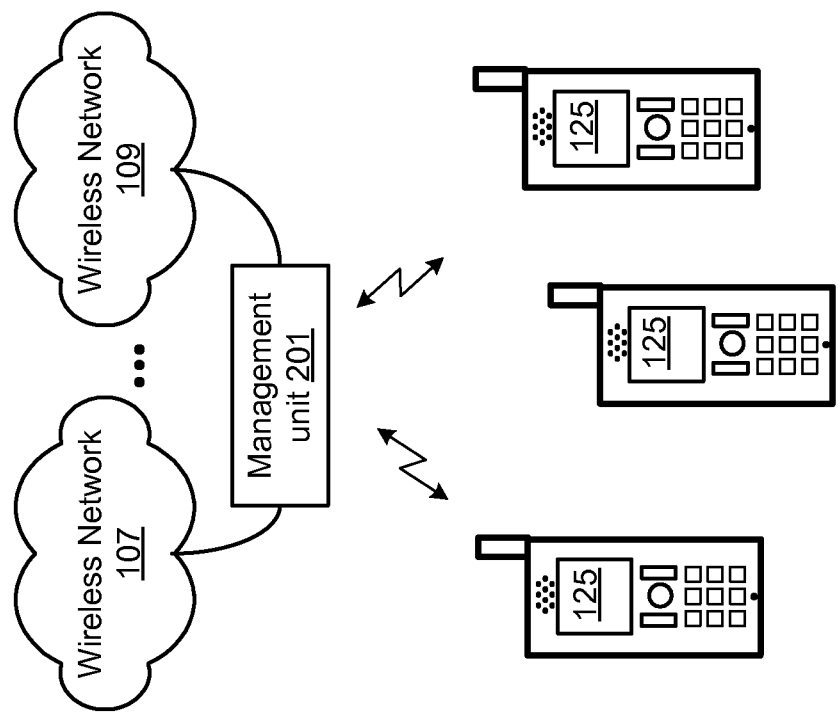
Figure 25:
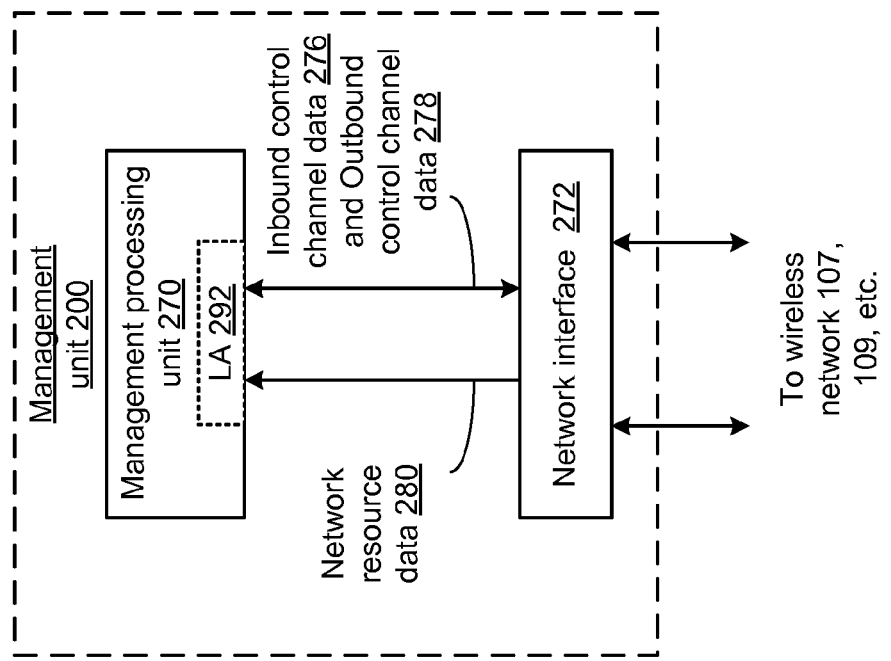
Figure 24:
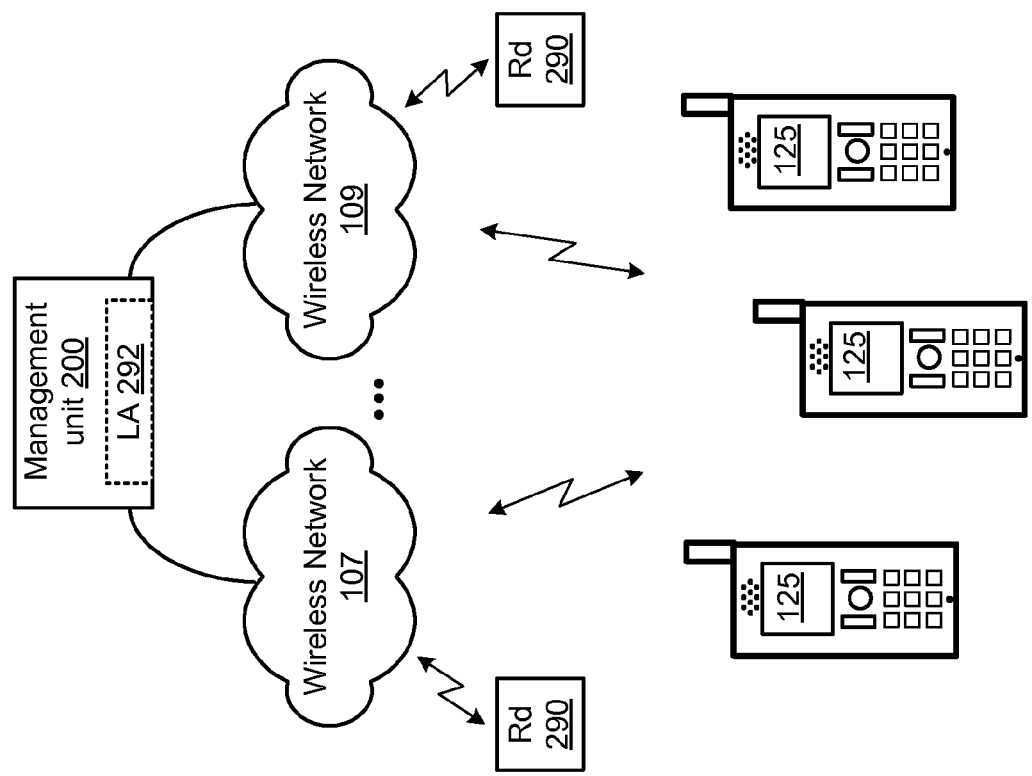
Figure 27:
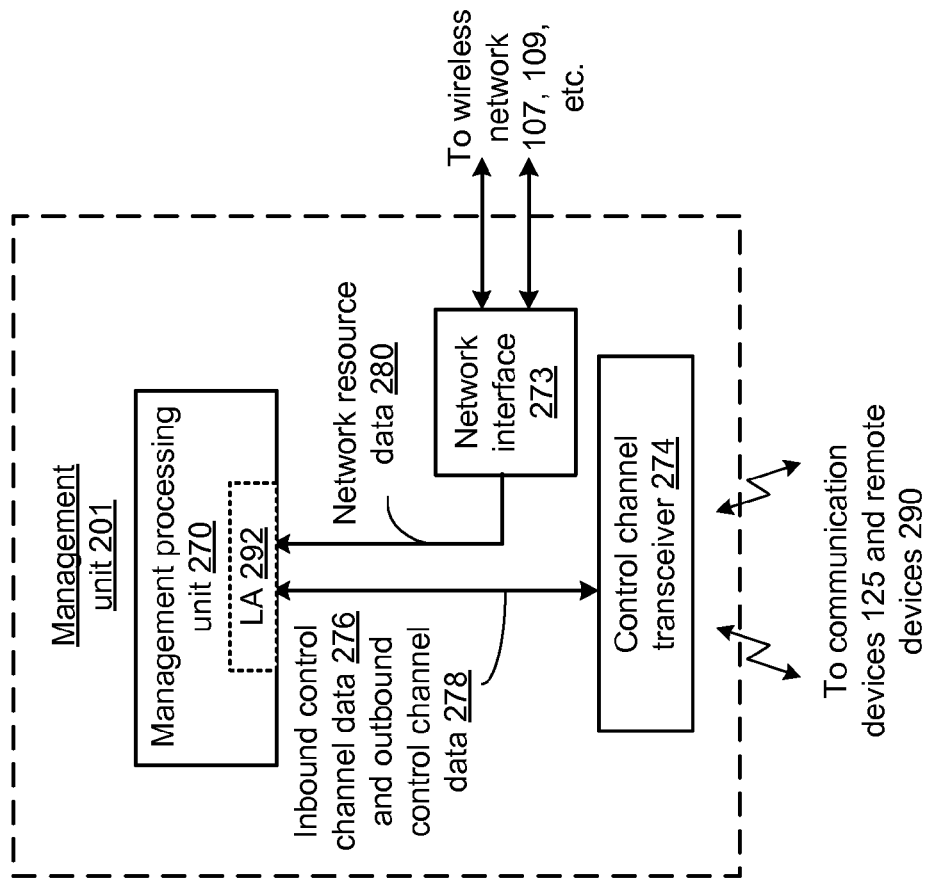
Figure 26:
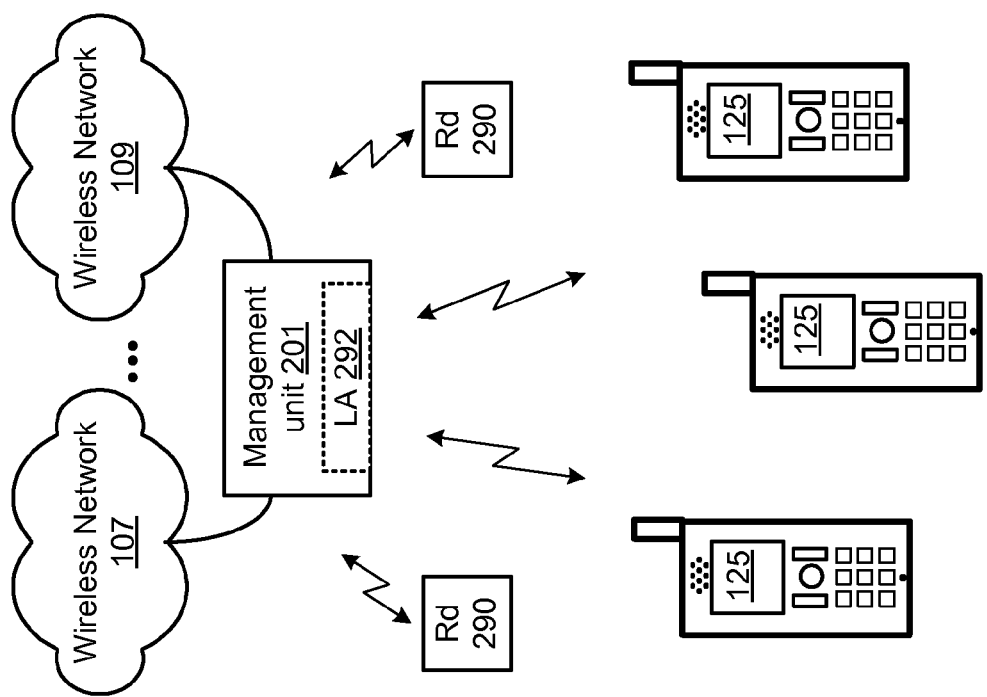
Figure 28:
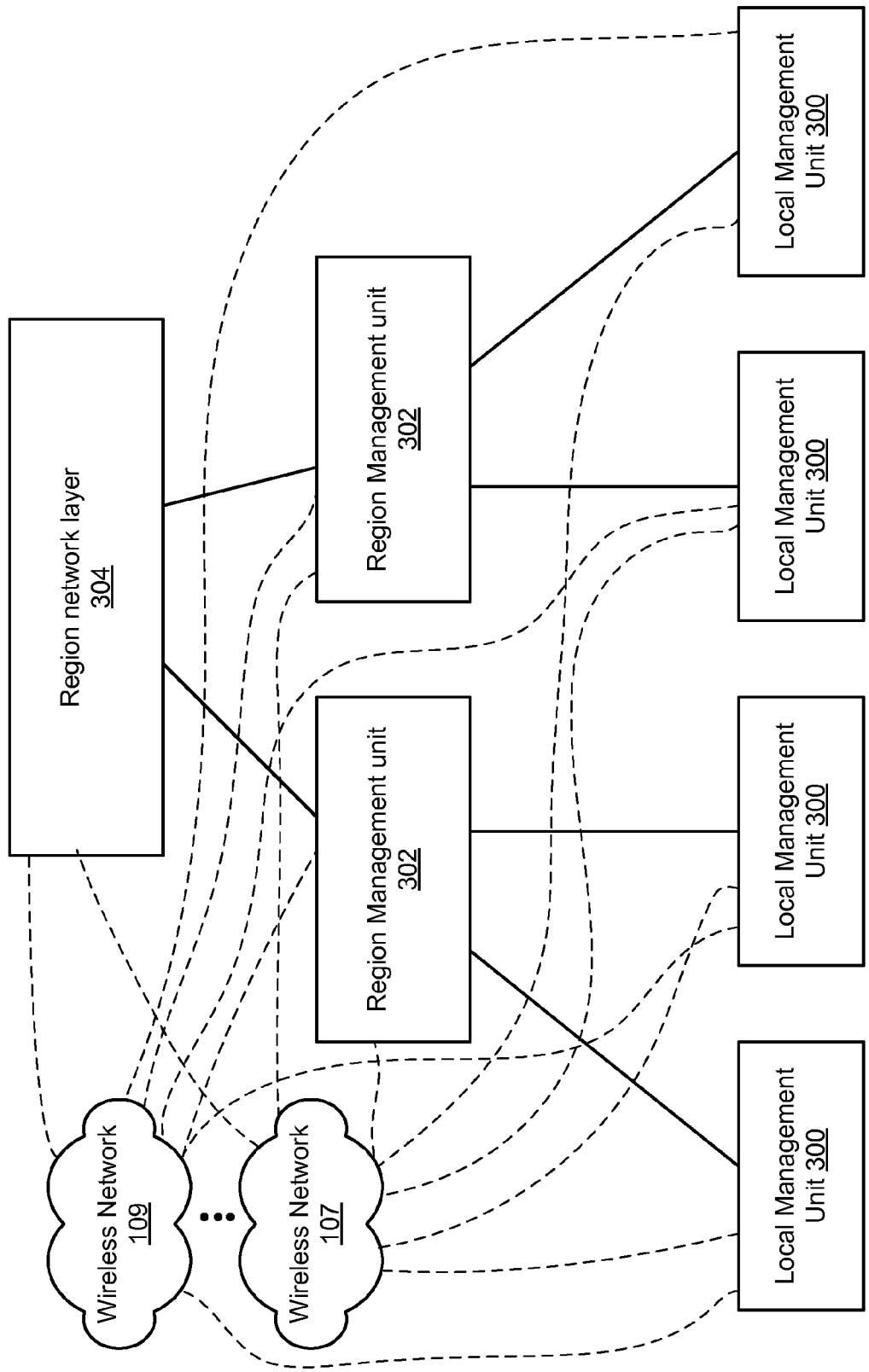
Figures 29, 30:
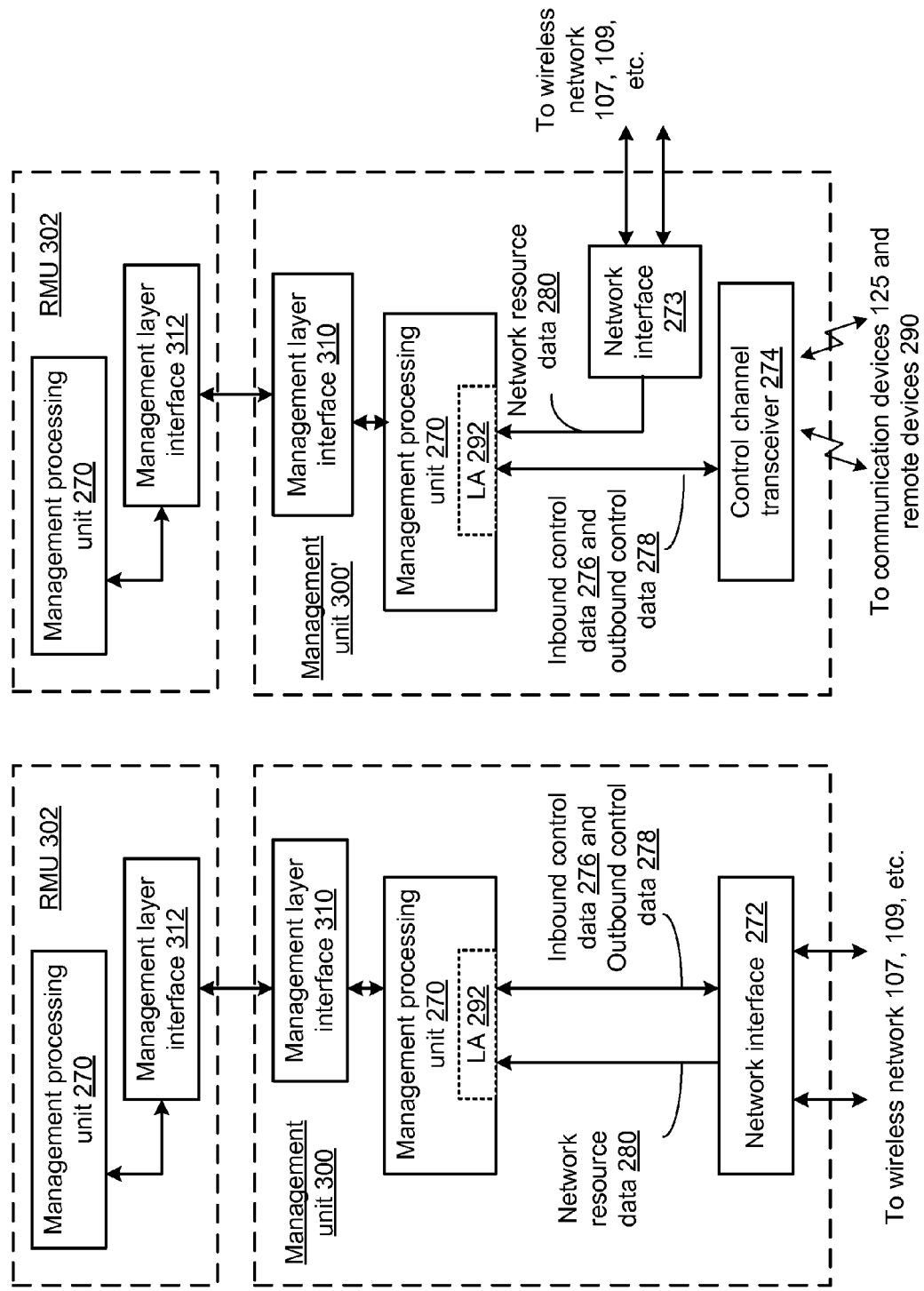
Figure 34:
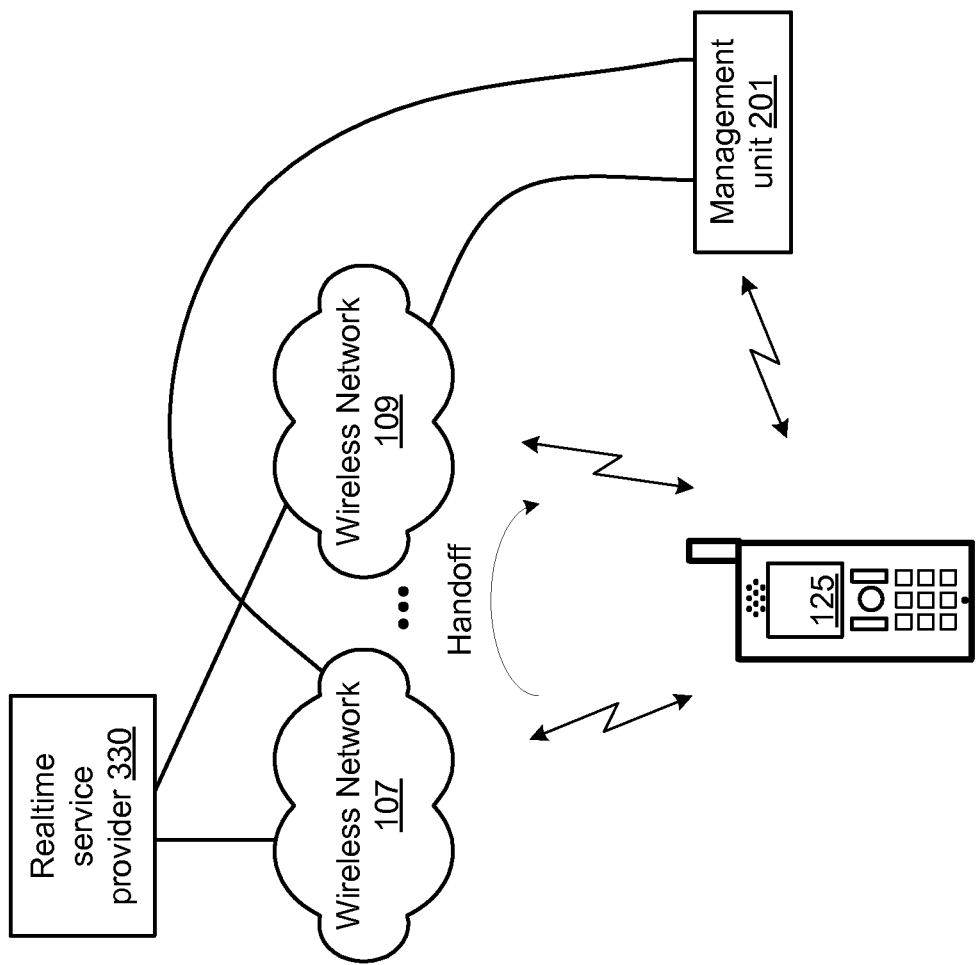
Figure 40:
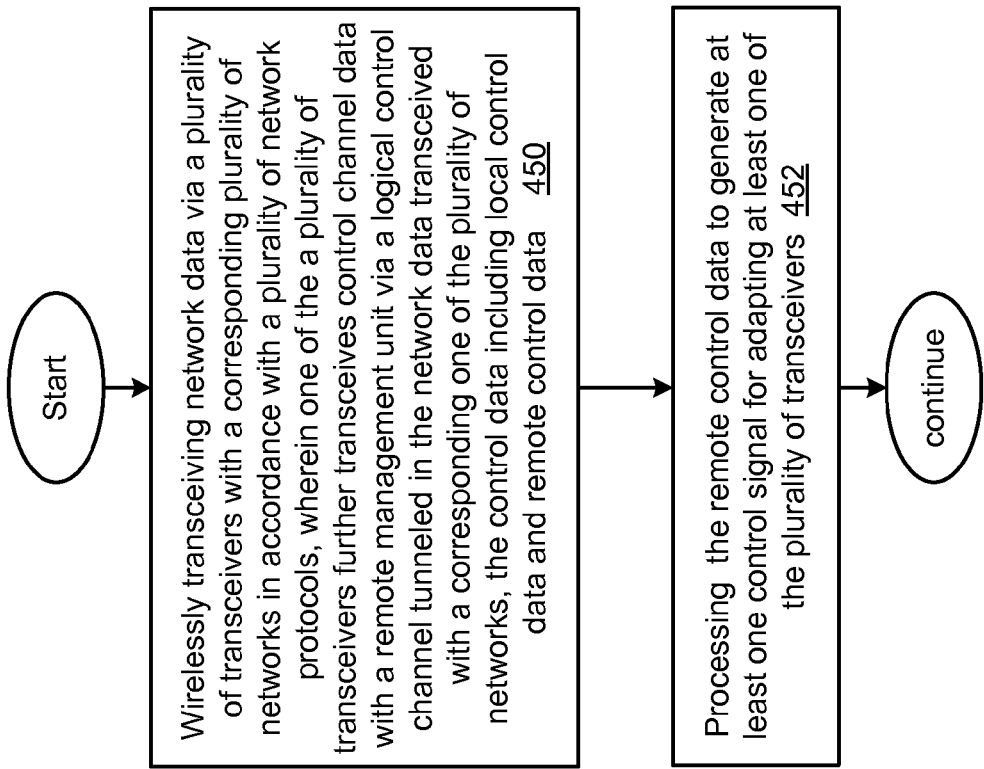
Figure 39:
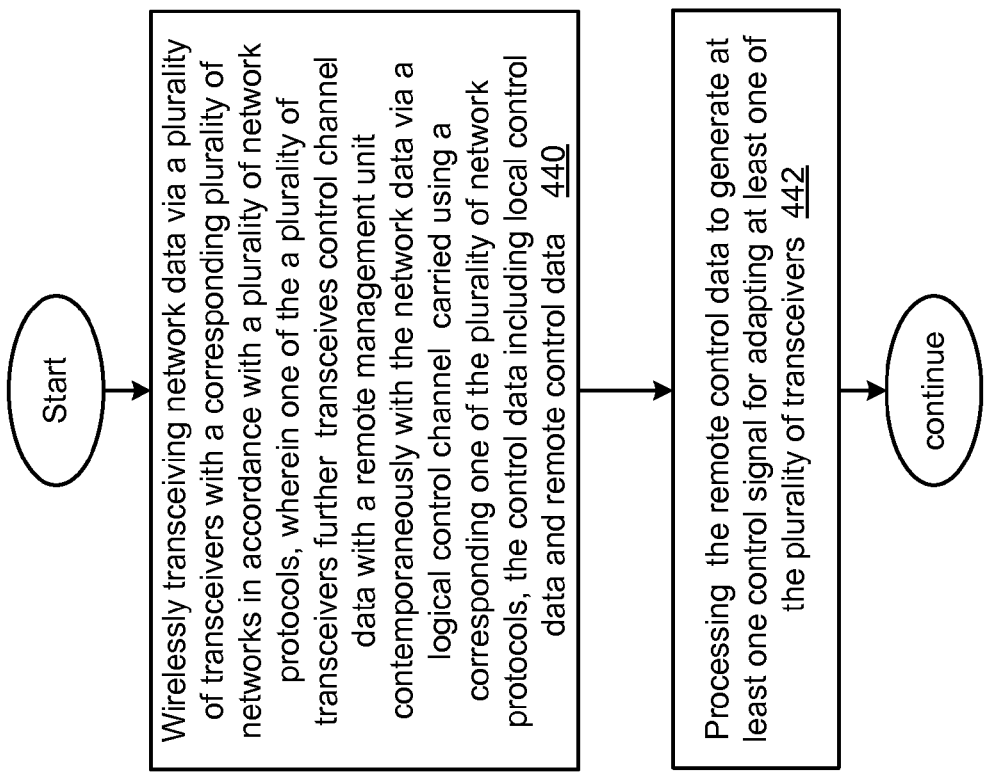
Figure 47:
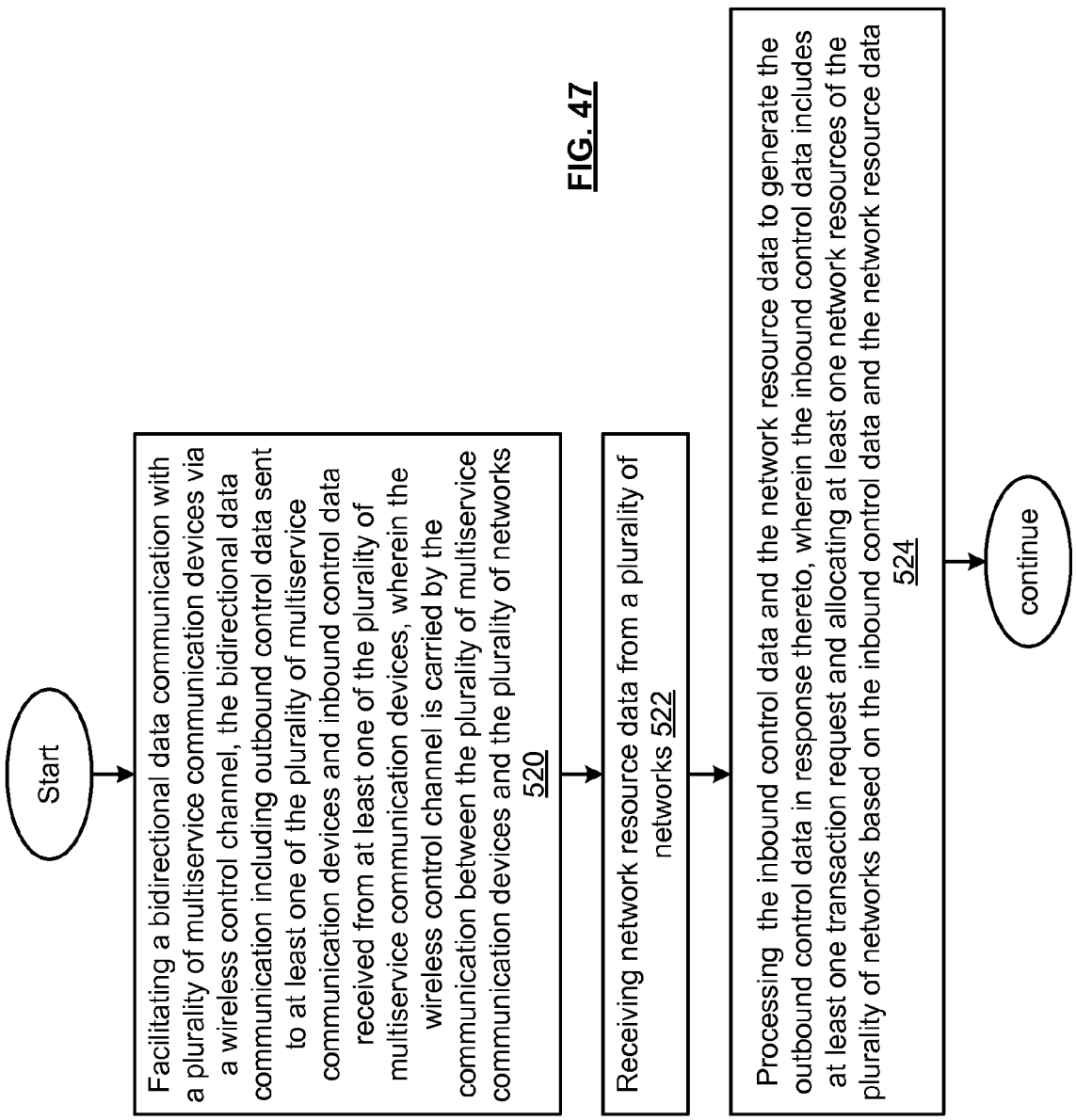
Figure 48:
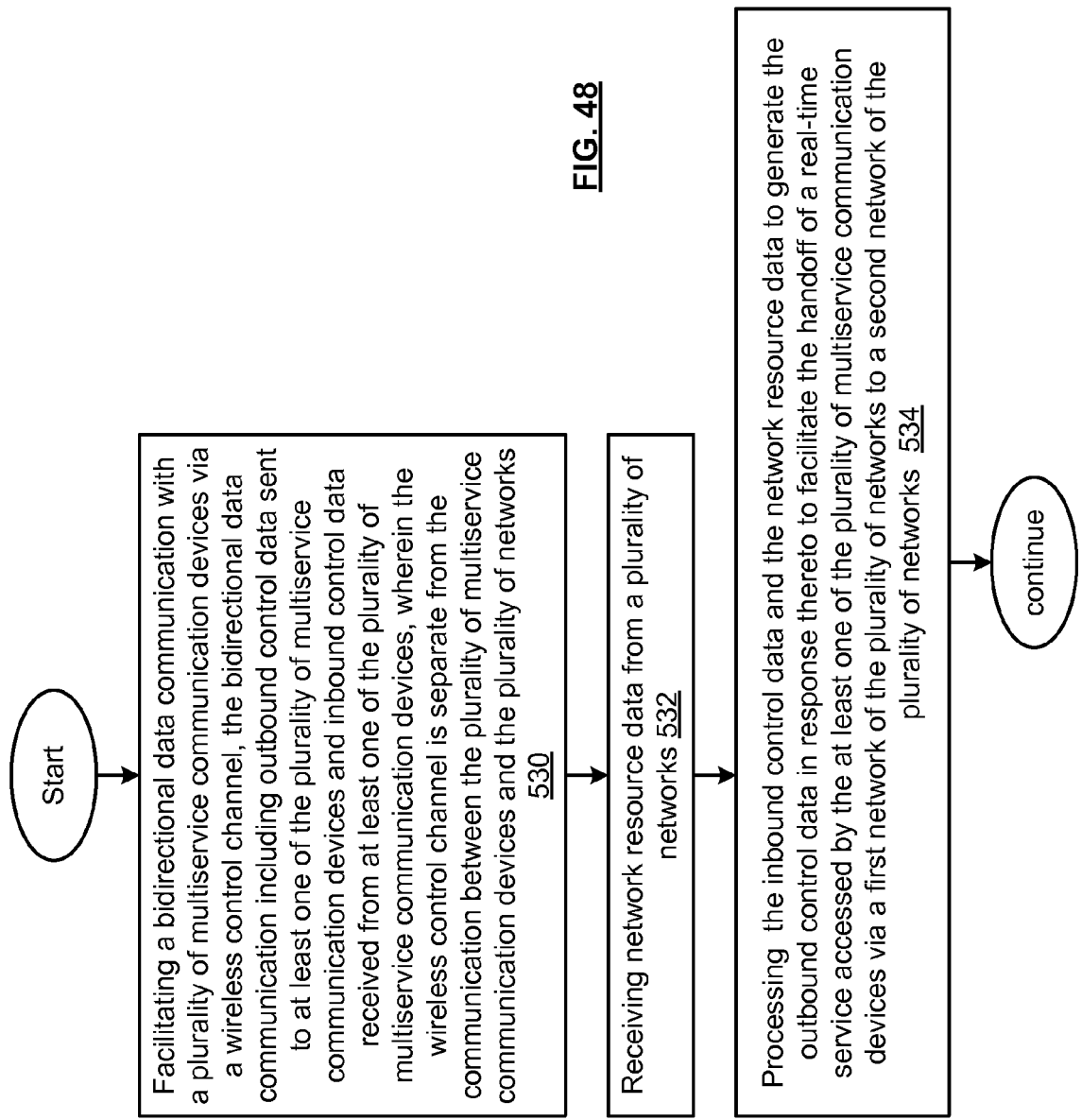
Figure 49:
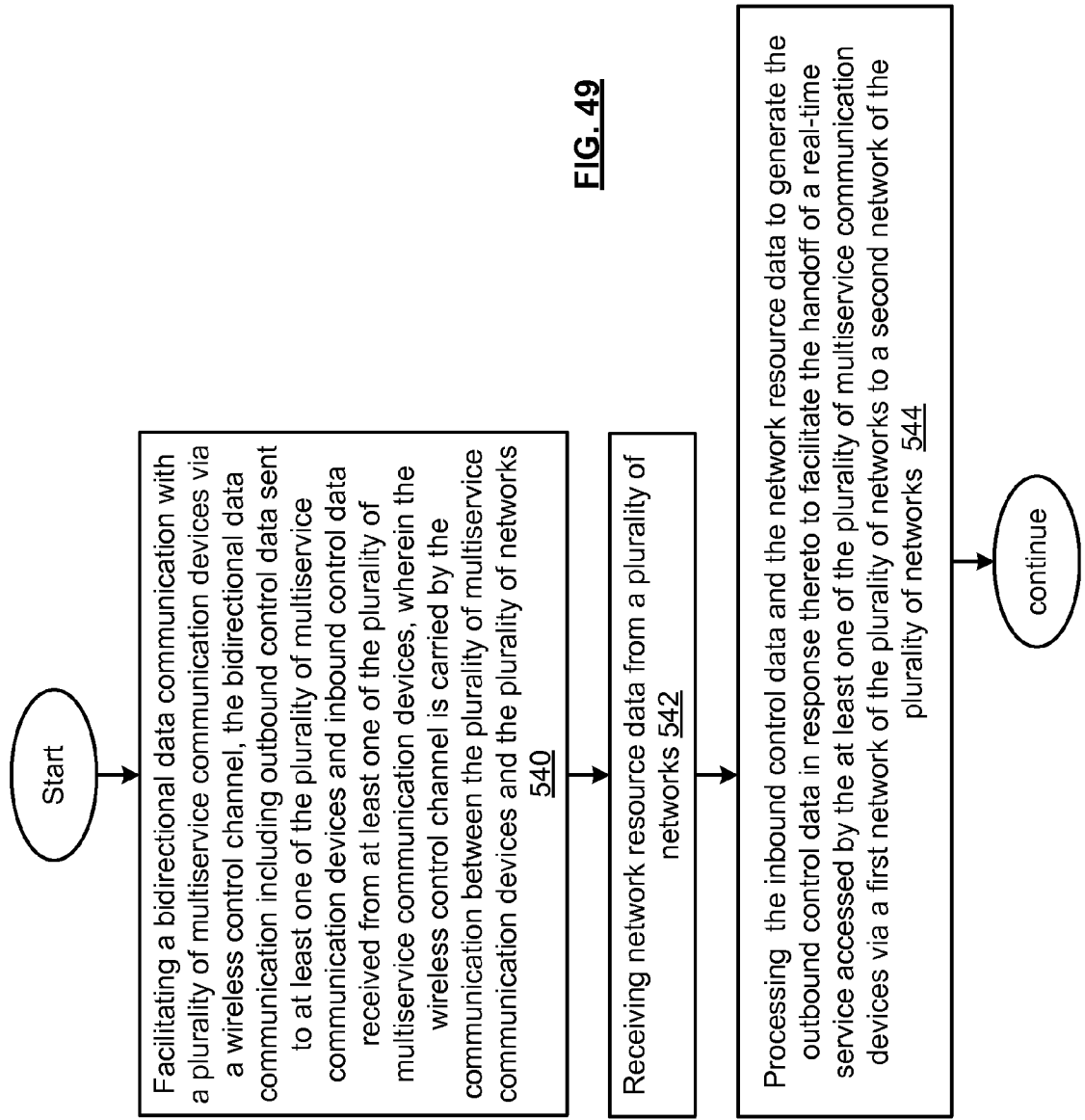

FIG. 13 is a schematic block diagram of an embodiment of another communication system in accordance with the present invention;

FIG. 14 is a schematic block diagram of another embodiment of a communication device 125 in accordance with the present invention;

FIG. 15 is a schematic block diagram of another embodiment of an RF transceiver 123' in accordance with the present invention;

FIG. 16 is a schematic block diagram of an embodiment of another communication system in accordance with the present invention;

FIG. 17 is a schematic block diagram of an embodiment of another communication system in accordance with the present invention;

FIG. 18 is a schematic block diagram of an embodiment of an RF transceiver 123" in accordance with the present invention;

FIG. 19 is a schematic block diagram of an embodiment of an RF transceiver 123''' in accordance with the present invention;

FIG. 20 is a schematic block diagram of an embodiment of another communication system in accordance with the present invention;

FIG. 21 is a schematic block diagram of an embodiment of a management unit in accordance with the present invention;

FIG. 22 is a schematic block diagram of an embodiment of another communication system in accordance with the present invention;

FIG. 23 is a schematic block diagram of another embodiment of a management unit in accordance with the present invention;

FIG. 24 is a schematic block diagram of an embodiment of another communication system in accordance with the present invention;

FIG. 25 is a schematic block diagram of another embodiment of a management unit in accordance with the present invention;

FIG. 26 is a schematic block diagram of an embodiment of another communication system in accordance with the present invention;

FIG. 27 is a schematic block diagram of another embodiment of a management unit in accordance with the present invention;

FIG. 28 is a schematic block diagram of an embodiment of a management network in accordance with the present invention;

FIG. 29 is a schematic block diagram of another embodiment of a management unit in accordance with the present invention;

FIG. 30 is a schematic block diagram of another embodiment of a management unit in accordance with the present invention;

FIG. 31 is a schematic block diagram of an embodiment of a processing module 225 in accordance with the present invention;

FIG. 32 is a schematic block diagram of an embodiment of another communication system in accordance with the present invention;

FIG. 33 is a schematic block diagram of an embodiment of another communication system in accordance with the present invention;

FIG. 34 is a schematic block diagram of an embodiment of another communication system in accordance with the present invention;

FIG. 35 is a flow chart of an embodiment of a method in accordance with the present invention;

FIG. 36 is a flow chart of an embodiment of a method in accordance with the present invention;

FIG. 37 is a flow chart of an embodiment of a method in accordance with the present invention;

FIG. 38 is a flow chart of an embodiment of a method in accordance with the present invention;

FIG. 39 is a flow chart of an embodiment of a method in accordance with the present invention;

FIG. 40 is a flow chart of an embodiment of a method in accordance with the present invention;

FIG. 41 is a flow chart of an embodiment of a method in accordance with the present invention;

FIG. 42 is a flow chart of an embodiment of a method in accordance with the present invention;

FIG. 43 is a flow chart of an embodiment of a method in accordance with the present invention;

FIG. 44 is a flow chart of an embodiment of a method in accordance with the present invention;

FIG. 45 is a flow chart of an embodiment of a method in accordance with the present invention;

FIG. 46 is a flow chart of an embodiment of a method in accordance with the present invention;

FIG. 47 is a flow chart of an embodiment of a method in accordance with the present invention;

FIG. 48 is a flow chart of an embodiment of a method in accordance with the present invention;

FIG. 49 is a flow chart of an embodiment of a method in accordance with the present invention;

FIG. 50 is a flow chart of an embodiment of a method in accordance with the present invention; and FIG. 51 is a flow chart of an embodiment of a method in accordance with the present invention.

DETAILED DESCRIPTION OF THE INVENTION

Figure 1:
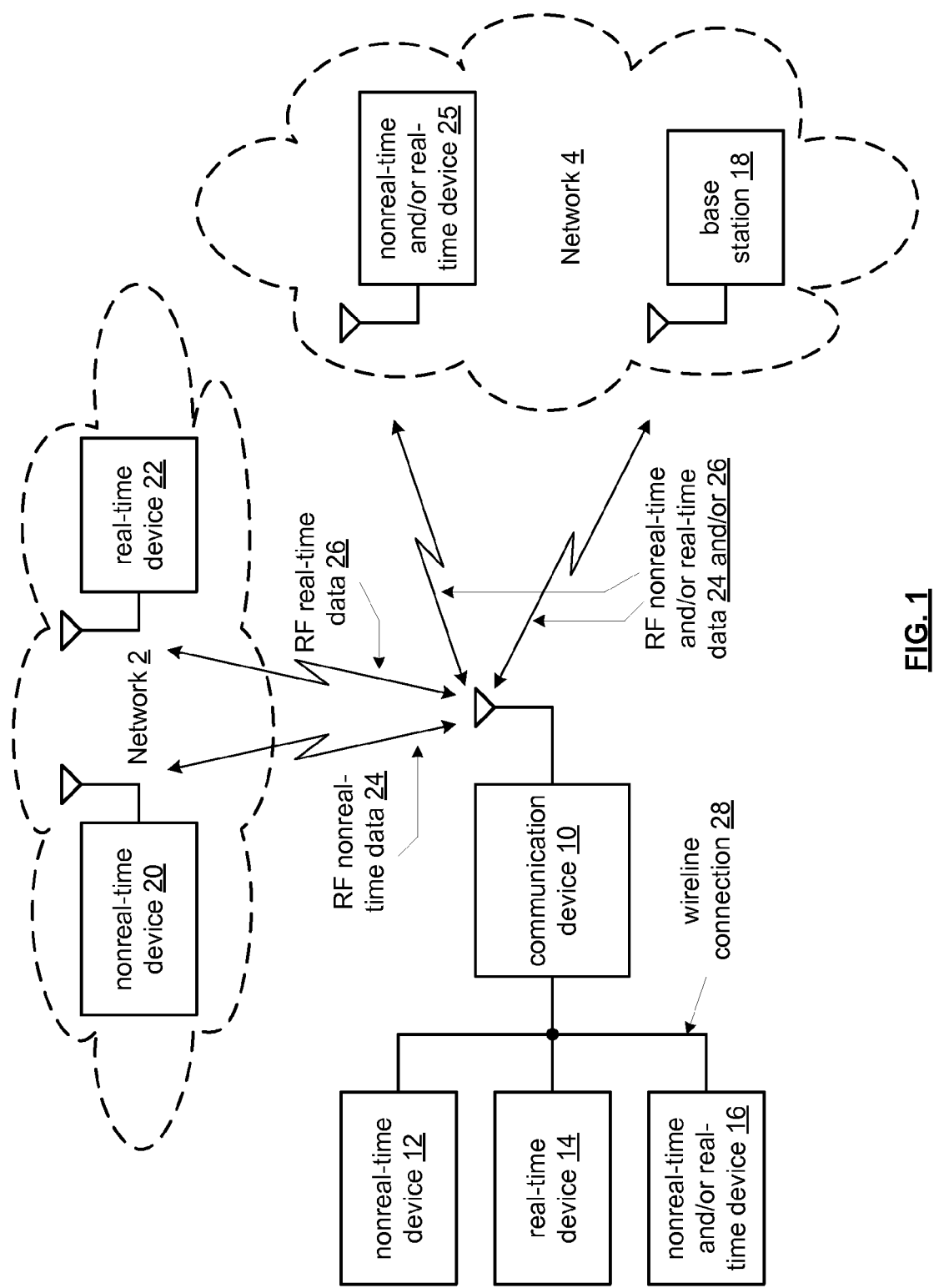
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25 of networks 2 and 4. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connections can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), WCDMA, LTE or other mobile wireless protocol or other wireless communication protocol, either standard or proprietary. Further, the wireless communication paths can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, game device, personal computer, laptop computer, wireless display or other device that performs one or more functions that include communication of voice and/or data via wireline connection 28 and/or the wireless communication paths. In an embodiment of the present invention, the real-time and non-real-time devices 12, 14 16, 18, 20, 22 and 25 can be base stations, access points, terminals, personal computers, laptops, PDAs, storage devices, cable replacements, bridge/hub devices, wireless HDMI devices, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, communication device 10 can be a multiservice device that is capable of communicating real time and/or non-real-time data wirelessly with multiple networks such as networks 2 and 4 either contemporaneously or non-contemporaneously. This multi-service functionality can include the ability to engage in communications over multiple networks, to choose the best network or have the best network chosen for it for engaging in a particular communication. For example, communication device 10 wishing to place a telephone call may launch a traditional telephone call with a remote caller over a cellular telephone network via a cellular voice protocol, a voice over IP call over a data network via a wireless local area network protocol, or on a peer-to-peer basis with another communication device via a Bluetooth protocol. In another example, communication device 10 wishing to access a video program might receive a streaming video signal over a cellular telephone network via a cellular data protocol, receive a direct broadcast video signal, download a podcast video signal over a data network via a wireless local area network protocol, etc.

In an embodiment of the present invention, the communication device 10 includes an integrated circuit, such as an RF integrated circuit that includes one or more features or functions of the present invention. Such integrated circuits shall be described in greater detail in association with FIGS. 3-51 that follow.

Figure 2:
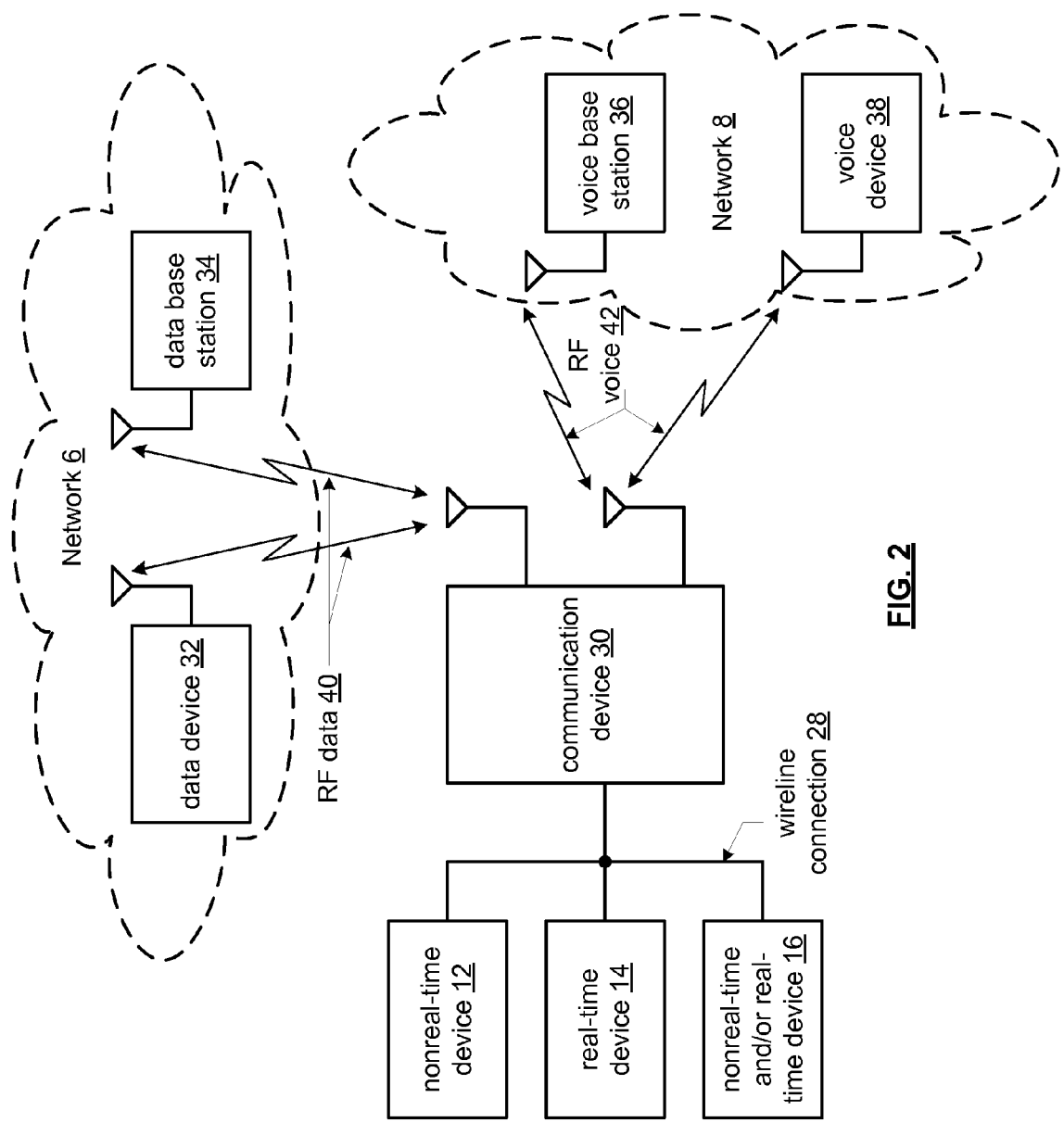
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two or more separate wireless transceivers for communicating, contemporaneously, via two or more wireless communication protocols with data device 32 and/or data base station 34 of network 6 via RF data 40 and voice base station 36 and/or voice device 38 of network 8 via RF voice signals 42.

FIG. 3 presents a pictorial representation of wireless networks 107 in accordance with an embodiment of the present invention. The wireless network 111, includes an access point 110 that is coupled to packet switched backbone network 101. The access point 110 manages communication flow over the wireless network 111 destined for and originating from each of communication devices 91, 93, 97 and 125. Via the access point 110, each of the communication devices 91, 93, 97 and 125 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

One or more of the communication devices 91, 93, 97 and 125, such as communication device 125 is a mobile device that can include the functionality of communication devices 10 or 30. In addition, communication device 125 can engage in communications via one or more other networks 2, 4 6 or 8 as discussed in conjunction with FIGS. 1 and 2.

FIG. 4 is a schematic block diagram of an embodiment of a communication device 125 in accordance with the present invention. In particular, integrated circuit (IC) 50 is shown that implements communication device 125 in conjunction with microphone 60, keypad/keyboard 58, memory 54, speaker/headset interface 62, display 56, camera 76, antenna interfaces 72 . . . 72', and wireline port 64. In operation, RF IC 50 includes a plurality of wireless transceivers such as transceivers 73 and 73' having RF and baseband modules for sending and receiving data such as RF real-time data 26 and non-real-time data 24 and transmitting via antenna interfaces 72 . . . 72' and antennas. Each antenna can be a fixed antenna, a single-input single-output (SISO) antenna, a multi-input multi-output (MIMO) antenna, a diversity antenna system, an antenna array that allows the beam shape, gain, polarization or other antenna parameters to be controlled or other antenna configuration. In addition, IC 50 includes input/output module 71 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Power management circuit (PMU) 95 includes one or more DC-DC converters, voltage regulators, current regulators or other power supplies for supplying the IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module 95 can selectively supply power supply signals of different voltages, currents or current limits or with adjustable voltages, currents or current limits in response to power mode signals received from the IC 50. While shown as an off-chip module, PMU 95 can be alternatively implemented as an on-chip circuit.

In addition, IC 50 may include an location generation module 48 that generates location or motion parameters based on the location or motion of the device such as a longitude, latitude, altitude, address, velocity, velocity vector, acceleration (including deceleration), and/or other location or motion parameter. Location generation module 48 can include a global positioning system (GPS) receiver, one or more accelerometers, gyroscopes or positioning sensors, a device that operates via triangulation data received via the network, or other location generation devices that generate or receive such location or motion parameters.

In operation, the RF transceivers 73 . . . 73' generate outbound RF signals from outbound data and generate inbound data from inbound RF signals to communication with a plurality of networks, such as networks 2, 4, 6, 8, etc. In an embodiment of the present invention, the IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

Also note that while certain modules of communication device 125 are shown to be included on IC 50 while others are not, IC 50 is shown for illustrative purposes and may include more or less of the modules of communication device 125, depending on the particular implementation. Further, communication device 125 can include additional modules or fewer modules than those specifically shown. In operation, the IC 50 executes operational instructions that implement one or more of the applications (real-time or non-real-time) attributed to communication devices 125 as discussed above and in conjunction with FIGS. 1-3.

FIG. 5 is a schematic block diagram of an embodiment of RF transceiver 123, such as transceiver 73 or 73', in accordance with the present invention. The RF transceiver 123 includes an RF transmitter 129, and an RF receiver 127. The RF receiver 127 includes a RF front end 140, a down conversion module 142 and a receiver baseband processing module 144 that operate under the control of control signals 141. The RF transmitter 129 includes a transmitter baseband processing module 146, an up conversion module 148, and a radio transmitter front-end 150 that also operate under control of control signals 141.

As shown, the receiver and transmitter are each coupled to an antenna through an antenna interface 171 and a diplexer (duplexer) 177, such as antenna interface 72 or 74, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration.

In operation, the transmitter receives outbound data 162 from other portions of its a host device, such as a communication application executed by processing module 225 or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164 that contain outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling.

Further, processing module 225 generates one or more control signals 141 to configure or adapt the RF transceiver 123 to communication with one or more of the networks 2, 4, 6 and 8. In operation, processing module 225 generates control signals 141 to modify the transmit and/or receiver parameters of the RF transceiver 125 such as protocol parameters, data rates, modulation types and other data parameters used by receiver processing module 144 and transmitter processing module 146, frequency bands, channels and bandwidths, filter settings, gains, power levels, ADC and DAC parameters, and other parameters used by RF front-end 140, radio transmitter front-end 150, down conversion module 142 and up conversion module 148, as well as antenna configurations used by antenna interface 171 to set the beam pattern, gain, polarization or other antenna configuration of the antenna.

The control signals 141 can be analog signals, digital signals, discrete-time signals of other signals that control the modules of RF transceiver 123 to adapt to communication via different networks. For example, in one mode of operation, communication device 125 includes a plurality of different transceivers 73 . . . 73', that are each designed and implemented by a particular RF transceiver 123 for communicating with one of the plurality of networks 2, 4, 6 and/or 8. Each of these RF transceivers 123 can be selectively enabled or disabled via control signals 141 to operate under the control of processing module 225 to communicate with its corresponding network 2, 4, 6 or 8 when required. In another embodiment of the present invention one or more of the transceivers 73 . . . 73' is implemented via a cognitive radio transceiver or other flexible RF transceiver 123 that can be configured to communicate with different networks based on a selected mode of operation. For example, such a flexible RF transceiver 123 can be configured to operate as either a Bluetooth transceiver, a GSM transceiver or a 802.11g transceiver based on the generation of the control signals 141 to implement the corresponding transmit and receive characteristics. Further details regarding particular conditions for generating control signals 141 will be discussed in conjunction with FIGS. 6-51 that follow.

FIG. 6 is a schematic block diagram of another embodiment of a communication device 125 in accordance with the present invention. In particular, a communication device is shown that includes many common elements shown in conjunction with FIG. 4. In this embodiment however, IC 50 includes an optional receiver 77, such as an environmental monitoring receiver, that can evaluate the RF environment via an analysis of RF signal spectrum 203.

In particular, communication device 125 includes a plurality of transceivers 73 that wirelessly transceive data with a corresponding plurality of networks, such as networks 2, 4, 6, 8, etc. in accordance with a corresponding plurality of network protocols. Receiver 77 receives and processes received RF signals, over a broadband spectrum, such as RF signal spectrum 203 and generates environmental data in response thereto. Processing module 225 processes the environmental data and generates one or more control signals 141 in response thereto for adapting the transceivers 73 based on the environmental data.

In operation, receiver 77 analyzed an RF spectrum that encompasses the frequency bands used by each of the transceivers 73 including optional frequency bands that can be used by each of these transceivers. The environmental data can identify unused spectrum, used spectrum, desired channels, undesired channels, noise and interference, that can be used to adapt the transceivers 73 to more favorable conditions.

In one example, when conditions with respect to a particular frequency channel begin to deteriorate or otherwise a better frequency channel is found by receiver 77 for use by one of the plurality of transceivers 73, processing module 225 can generate control signals 141 and outbound data to coordinate with a remote station via control signaling and to switch the new frequency channel and to change the transceiver 73 to the new frequency channel. In another example, when communications with a particular network begin to deteriorate or otherwise a better network is found by receiver 77 for use by communication device 125, processing module 225 can generate control signals 141 and outbound data to coordinate a handoff to a new network or a new network device and either adapt a transceiver 73 to the new network or switch the transceiver 73 in use to a transceiver adapted for communication with the new network or network device. In addition, transceiver 73 can take on the function of receiver 77 during idle periods. In a further example, when communication conditions, such as noise and interference change for a particular transceiver, processing module 225 can generate control signals 141 to modify a transmission parameter and/or a receive parameter of the transceiver 73 to adapt to the change in conditions.

FIG. 7 is a graphical representation of a spectrum 210 in accordance with an embodiment of the present invention. In particular, spectrum 210 represents an example of an RF signal spectrum 203 received by an environmental monitoring receiver, such as receiver 77. In an embodiment of the present invention, the receiver 77 receives and analyses the RF signal spectrum and can identify unused portions of spectrum, such as available spectrum 212, based on the lack of signal energy in these spectra. In addition, receiver 77 can identify undesired channels, by identifying regions with unacceptable levels of noise and interference 214 based on signal to noise ratios, signal to noise and interference ratios, packet error rates, data rates, etc.

FIG. 8 is a graphical representation of a spectrum 220 in accordance with an embodiment of the present invention. In particular, spectrum 220 represents another example of an RF signal spectrum 203 received by a environmental monitoring receiver, such as receiver 77. In addition to the functions and features described in conjunction with FIG. 7, receiver 77 can identify desired channels, such as desired channel 222, also based the availability of remote stations with available capacity to service the communication device 125. In particular, desired channels can be identified based on the presence of strong beacon signals or other communications from remote devices indicating that a network is present and that signals can be received with acceptable levels of noise and/or interference.

FIG. 9 is a schematic block diagram of an embodiment of an RF receiver 127' in accordance with the present invention. RF receiver 127', such as receiver 77, shares many common elements with RF receiver 127 that are referred to by common reference numerals. Receiver 127' can be implemented via a dedicated radio receiver, or as a cognitive radio transceiver or other flexible transceiver, such as one of the transceivers 73 configured to operate via control signals 141 as an environmental monitoring transceiver in an environmental monitoring mode of operation. In operation, RF receiver 127' receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module, high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce environmental data 161. The processing performed by the receiver processing module 144 includes, but is not limited to, digital intermediate frequency to baseband conversion, demodulation, demapping, depuncturing, decoding, and/or descrambling as well as optional further processing to indicate unused spectrum, used spectrum, desired channels, undesired channels, noise and interference, etc.

In an embodiment of the present invention, RF receiver 127' includes RF front-end 140 and down conversion module 142 that implement a narrowband receiver that is scanned over a broadband spectrum, such as RF signal spectrum 203. In this fashion, individual portions of the spectrum, the RF receiver 127' can be tuned to individual frequency bands or individual frequency channels for analysis to generate environmental data 161. In one mode of operation, the RF receiver 127' can be adaptively scanned over the broadband spectrum to avoid transmission interference from at least one of the plurality of transceivers 73. In particular, the RF receiver 127' can be operated via control signals 141' generated by processing module 225 to avoid being tuned to frequency bands or channels at the same time the particular a particular frequency band or channel is being used for transmission by one of the other transceivers 73 . . . 73' of communication device 125.

In another embodiment of the present invention, the RF receiver 127' includes RF front-end 140 and down conversion module 142 that implement a broadband receiver that contemporaneously captures the received RF signals over a broadband spectrum and generates environmental data by analyzing the broadband spectrum using frequency domain analysis. For example, the down conversion module 142 can digitize baseband or low IF signals over a broad range of frequencies and perform a fast Fourier transform (FFT) or use other frequency domain methodologies in receiver processing module 144 to generate environmental data 161. In one mode of operation, the RF receiver 127' can adaptively capture data from the broadband spectrum to avoid transmission interference from at least one of the plurality of transceivers 73. In particular, the RF receiver 127' can be operated via control signals 141' generated by processing module 225 to avoid capturing or analyzing inbound RF signal 152 at the same time the particular one of the transceivers 73 . . . 73' of communication device 125 is transmitting.

FIG. 10 is a schematic block diagram of an embodiment of another communication system in accordance with the present invention. Communication device 125 is shown transceiving network data with a plurality of networks 107 and 109, such as networks 2, 4, 6, 8 in accordance with a plurality of network protocols. In this embodiment of the present invention, control data is communicated between a remote management unit 200 and the communication device 125 via a logical control channel carried via network data communicated via either network 107 or network 109. The management unit 200 assists the communication device 125 in the configuration of one or more of the transceivers 73 . . . 73'.

In particular, at least one of the transceivers 73 . . . 73' further transceives control channel data with the remote management unit 200 contemporaneously with the network data via a logical control channel carried using the corresponding one of the plurality of network protocols. The control channel data includes local control data sent to the management unit 200 and remote control data received from the management unit 200. In accordance with this embodiment, processing module 225 processes the remote control data and generates a least one control signal 141 in response thereto, the at least one control signal 141 for adapting at least one of the transceivers 73 . . . 73' based on the remote control data.

The local control data sent to the management unit 200 can include location data or motion data generated by the location generation module 48; RF environmental data, such as environmental monitoring data 161, battery remaining generated by power management unit 95; desired quality of service; a latency preference; a cost preference; a transaction request such as a request for a particular network service or application; a device characteristic; and/or a data rate preference; generated by a communication application executed by processing module 225 or other module of communication device 125.

In an embodiment of the present invention, processing module 225 operates via state machine, algorithm, look-up table or calculation, to generate control signals 141 and/or 141' based on the remote control data received from management unit 200. In this fashion, management unit 200 can evaluate task requests that describe what a user communication device 125 wishes to do, e.g. download an audio file, place a telephone call, send a message, play a game, watch a video, etc., and gather other information from communication device 125 via the local control data regarding the capabilities, preferences and status of the device, and environmental data along with other pertinent data if any, and assist communication device in the configuration of its transceivers to fulfill the requested tasks via networks 107, 109, etc. In addition, management module 200 can evaluate local control data during the provision of a particular network service to assist communication device 125 in adjusting transmit and receive parameters for better performance, switch frequency channels, and/or to handoff to other networks.

FIG. 11 is a schematic block diagram representation of a portion of a protocol stack in accordance with an embodiment of the present invention. As discussed in conjunction with FIG. 10, control data can be communicated between a remote management unit 200 and communication device 125 via a logical control channel. In this embodiment control data is carried via a control channel protocol 230 such as an application specific control channel protocol or universal protocol such as an IP protocol. This control channel protocol 230 is stacked above the particular network protocol 232 in the protocol stack 231 used to communicate between communication device 125 and the wireless network 107 or 109

In operation, local control data received in network data from communication device 125 via network 107 or 109 is routed to management unit 200. The local control data further includes a device identifier, such as an identification number or address that is specific to communication device 125 that is used to route remote control data from management unit 200 back to communication device 125 via additional network data.

FIG. 12 is a schematic block diagram representation of network protocol packet in accordance with an embodiment of the present invention. In particular, a network protocol packet 234 is shown that includes a packet payload 238 and a packet overhead section 236 such as a packet header or other overhead section. In this embodiment the logical control channel is implemented by tunneling control data, such as control data 235 in a packet payload, such as packet payload 238.

In this embodiment, local control data included in control data 235 and received in network data from communication device 125 via network 107 or 109, can be routed to management unit 200. The local control data further includes a device identifier, such as an identification number or address that is specific to communication device 125 that is used to route remote control data from management unit 200 back to communication device 125 via control data 235.

FIG. 13 is a schematic block diagram of an embodiment of another communication system in accordance with the present invention. In particular, an embodiment is shown that includes management unit 201. In this embodiment, management unit 201 operates as management unit 200 described in conjunction with FIG. 10, however management unit 201 communicates with communication device 125 via a separate wireless control channel, such as a direct wireless channel between the management unit 201 and the communication device 125. In an embodiment of the present invention, the control channel is utilizes a control channel protocol, such as a standardized protocol, that differs from the plurality of network protocols used by networks 107, 109, etc. to communicate with communication device 125. In the alternative, a network protocol could be reused for this purpose or a universal protocol such as an IP protocol could further be employed.

In this configuration communication device 125 can include a dedicated control channel transceiver to communicate with management unit 201. In this fashion, the control channel can be present to communicate control data and to assist the communication device 125 in the configuration of one or more of the transceivers 73 . . . 73'. In an alternative embodiment, communication device 125 can configure one of the transceivers 73 . . . 73' to operate as a control channel. For instance, upon start-up of the device, movement to a new area or otherwise in a default mode of operation, the communication device 125 can configure one of the transceivers 73 . . . 73' to operate as a control channel and communicate with management unit 201 to determine what networks and network resources are available. Management unit 201 can exchange control data with communication device 201 to determine particular device parameters to configure one or more of its transceivers 73 . . . 73' to operate with the available network or networks, such as networks 107, 109, etc., based on the particular task or tasks requested by the communication device 125.

Further, after set-up is complete the remote control data received by the management unit 201 can include further reconfigure the particular transceiver 73 or 73', etc., previously used to implement the control channel, to communicate with a network 107, 109, etc. Optionally, the communication device 125 can return the transceiver back to the control channel mode of operation in the event a network is lost, a transceiver 73 . . . 73' becomes available, a start-up is initiated, the communication devices moves to a new area, or otherwise as initiated by a communication application executed by processing module 225 or under user control.

FIG. 14 is a schematic block diagram of another embodiment of communication device in accordance with the present invention. In particular, a communication device is shown that shares many common elements of the communication devices 125 described in conjunction with FIGS. 4 and 9 that are referred to by common reference numerals. In this embodiment however, RFIC 50 includes a control channel transceiver to communicate with management unit 201. Transceiver 75 can be a dedicated control channel transceiver. In this fashion, the control channel can be present to communicate control data and to assist the communication device 125 in the configuration of one or more of the transceivers 73 . . . 73'. In an alternative embodiment, communication device 125 can configure one of the transceivers 73 . . . 73' to operate as a control channel transceiver 75 in a control channel mode of operation.

FIG. 15 is a schematic block diagram of another embodiment of an RF transceiver 123' in accordance with the present invention. In particular, an RF transceiver 123' is shown that shares many common elements of the RF transceiver 123 described in conjunction with FIG. 5 that are referred to by common reference numerals and that can be used to implement transceiver 75. RF Transceiver 123' can be a dedicated control channel transceiver that implements a physical control channel via outbound RF signal 170' and inbound RF signal 152'. Inbound RF signals 152' from the management unit 201 are processed by RF receiver 127 to produce remote control data 252. In addition, local control data is processed by RF transmitter 129 to produce an outbound RF signal 170' that is sent to the management unit 201. In this fashion, the control channel can be present to communicate control data and to assist the communication device 125 in the configuration of one or more of the transceivers 73 . . . 73'. In an alternative embodiment, communication device 125 can configure one of the transceivers 73 . . . 73' to operate as a RF transceiver 123' via optional control signals 141 in a control channel mode of operation.

FIG. 16 is a schematic block diagram of an embodiment of another communication system in accordance with the present invention. In particular, a communication system is shown wherein the management unit supplies cognitive transceiver configuration data 260 via a control channel to configure one or more cognitive radio transceivers of communication device 125. In this fashion, the cognitive radio transceiver can be configured for communication on different frequency channels, different frequency bands, with different networks, via different data rates and different protocols, to adapt to environmental conditions, device conditions and/or to otherwise be adapted with other transmit and receive characteristics.

For example, a logical control channel can be established between the communication device 125 and the management unit 200 via either a dedicated control channel transceiver, a transceiver operated in a control channel mode of operation, or a cognitive radio transceiver configured for operation as a control channel transceiver. Local control channel data is sent to the management unit 200 that can include environmental data collected via a dedicated environmental monitoring transceiver, a transceiver operated in an environmental monitoring mode of operation or a cognitive radio transceiver configured to operate as an environmental monitoring receiver. In addition, the local control data can include a task request, such as to place a telephone call, and further include device conditions such as preferred data rates, battery life remaining, device model and optional operating system or communication application characteristics and other parameters. In response, the management unit selects a particular network, such as network 107 which is, in this example, a 900 MHz GSM mobile telephone network that management unit 200 knows can be received well by communication device 125 based on the environmental data it has received as part of the local control data. Further, management unit 200 generates cognitive transceiver configuration data 260 and sends this data to the communication device 125. Communication device receives the cognitive transceiver configuration data and configures one of its cognitive radio transceivers to operate as a 900 MHz GSM transceiver, establishes communication with network 107 and begins to fulfill its requested task of placing a telephone call.

Particular cognitive radio transceiver implementations will be discussed in conjunction with FIGS. 18-19 that follow.

FIG. 17 is a schematic block diagram of an embodiment of another communication system in accordance with the present invention. Like the communication system of FIG. 16, a communication system is shown wherein a management unit supplies cognitive transceiver configuration data 260 via a control channel to configure one or more cognitive radio transceivers of communication device 125. In this fashion, the cognitive radio transceiver can be configured for communication on different frequency channels, different frequency bands, with different networks, via different data rates and different protocols, to adapt to environmental conditions, device conditions and/or to otherwise be adapted with other transmit and receive characteristics. In this embodiment, a management unit 201 is used in place of management unit to communicates with communication device 125 via a direct or separate physical control channel, as discussed, for instance in conjunction with FIGS. 13-14.

FIG. 18 is a schematic block diagram of an embodiment of an RF transceiver 123" in accordance with the present invention. In particular, an RF transceiver 123" is shown that shares many common elements of the RF transceivers 123 and 123' described in conjunction with FIGS. 5 and 15 that are referred to by common reference numerals and that can be used to implement transceivers 73, 73' and 75. The RF transceiver 123" includes an RF transmitter 229, and an RF receiver 227. The RF receiver 227 includes a RF front end 140, a down conversion module 142 and a receiver processing module 144'. The RF transmitter 229 includes a transmitter processing module 146', an up conversion module 148, and a radio transmitter front-end 150.

As shown, the receiver and transmitter are each coupled to an antenna through an antenna interface 171 and a diplexer (duplexer) 177, such as antenna interface 72 or 74, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration.

In operation, the transmitter receives outbound realtime data 162 from other portions of its a host device, such as a communication application executed by processing module 225 or other source via the transmitter processing module 146'. The transmitter processing module 146' processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164 that contain outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146' can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144' processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144' includes, but is not limited to, digital intermediate frequency to baseband conversion, demodulation, demapping, depuncturing, decoding, and/or descrambling.

In an embodiment of the present invention, the RF transceiver 123" can be configured as a control channel transceiver to receive inbound data 160 that includes cognitive transceiver configuration data 260. The RF transceiver 123" can be configured as a control channel transceiver in a default mode of operation and then reconfigure itself based on the cognitive transceiver configuration data 260 received via either a physical or logical control channel established with management unit 200 or 201. Then, for example, when communication device 125 completes the task assigned to it in its reconfigured state, the RF transceiver 123" can reconfigure itself again to revert back to operation as a control channel transceiver.

The processing module 225 receives the cognitive transceiver configuration data 260 and generates one or more control signals 141 to configure or adapt the RF transceiver 123" in response thereto. Like the processing module 225 of RF transceiver 123', processing module 225 generates control signals 141 to modify the transmit and/or receiver parameters of the RF transceiver 125 such as protocol parameters, data rates, modulation types and other data parameters used by receiver processing module 144' and transmitter processing module 146', frequency bands, channels and bandwidths, filter settings, gains, power levels, ADC and DAC parameters, and other parameters used by RF front-end 140, radio transmitter front-end 150, down conversion module 142 and up conversion module 148, as well as antenna configurations used by antenna interface 171 to set the beam pattern, gain, polarization, frequency band or other antenna configuration of the antenna.

For example, the cognitive transceiver configuration data 260 can include receiver frequency band configuration data for configuring the frequency band of the receiver front-end 140 via adjustment of a local oscillator frequency, filter bandwidth, etc, via control signals 140. The cognitive transceiver configuration data 260 can include transmitter frequency band configuration data for configuring the frequency band of the transmitter front end via adjustment of a local oscillator frequency, filter bandwidth, etc. The cognitive transceiver configuration data 260 can include baseband processing configuration data for configuring at least one baseband processing parameter of the receiver baseband processing module 144' such as a particular modulation scheme, protocol, data rate, etc. The cognitive transceiver configuration data 260 can include baseband processing configuration data for configuring at least one baseband processing parameter of the transmitter baseband processing module 146' such as a particular modulation scheme, protocol, data rate, etc.

The control signals 141 can be analog signals, digital signals, discrete-time signals of other signals that control the modules of RF transceiver 123" to adapt to communication via different networks. In this fashion, such a cognitive RF transceiver 123" can be configured to operate as either a Bluetooth transceiver, a GSM transceiver or a 802.11g transceiver based on the generation of the control signals 141 to implement the corresponding transmit and receive characteristics.

In a further mode of operation, the receiver processing module 144' includes a receiver application memory 240 that stores a receiver application that is executed by the receiver processing module to perform the functionality of this receiver processing module 144'. In a default mode of operation the receiver application memory can store a default receiver application that causes the receiver processing module to operate in a particular configuration—such as a GSM receiver, a Bluetooth receiver, a CDMA receiver, a WIMAX receiver, and UWB receiver, a 802.11 receiver or as a control channel receiver, etc. The cognitive transceiver configuration data 260 can includes other baseband processing application data that can be received and stored in receiver application memory 240 and for execution by the receiver baseband processing module 144' in a new configuration. For example, while operating as a control channel receiver, the RF receiver 227 can receive cognitive transceiver configuration data 260 that includes baseband processing application data with a new receiver application, for example a GSM receiver application, that is stored in receiver application memory 240 and executed by the receiver baseband processing module 144' as part of a reconfiguration of the RF receiver 227 by processing module 225 as a GSM receiver.

In a similar fashion, the transmitter processing module 146' includes a transmitter application memory 241 that stores a transmitter application that is executed by the transmitter processing module to perform the functionality of the transmitter processing module 146'. In a default mode of operation, the transmitter application memory can store a default transmitter application that causes the transmitter processing module to operate in a particular configuration—such as a GSM transmitter, a Bluetooth transmitter, a CDMA transmitter, a WIMAX transmitter, and UWB transmitter, a 802.11 transmitter or as a control channel transmitter, etc. The cognitive transceiver configuration data 260 can includes other baseband processing application data that can be received and stored in transmitter application memory 241 and for execution by the transmitter baseband processing module 146' in a new configuration. For example, while operating as a control channel transceiver, the RF transceiver 123" can receive cognitive transceiver configuration data 260 that includes baseband processing application data with a new transmitter application, for example a GSM transmitter application, that is stored in transmitter application memory 241 and executed by the transmitter baseband processing module 146' as part of a reconfiguration of the RF transmitter 229 by processing module 225 as a GSM transmitter.

It should be noted that the examples presented above are merely illustrative of the many possible configurations and reconfigurations of such as cognitive RF transceiver 123".

FIG. 19 is a schematic block diagram of an embodiment of an RF transceiver 123'" in accordance with the present invention. In particular, an RF transceiver 123''' is shown that shares many common elements of the RF transceivers 123, 123' and 123" described in conjunction with FIGS. 5, 15 and 18 that are referred to by common reference numerals and that can be used to implement transceivers 73, 73' and 75. In this embodiment however, the cognitive transceiver configuration data 260 is received via another transceiver, 73, 73' or 75 of communication device 125 that is configured as a physical or logical control channel transceiver. In this fashion, multiple transceivers of communication device 125 can be configured or reconfigured to different applications under the control or collaboration with management unit 200 or 201.

FIG. 20 is a schematic block diagram of an embodiment of another communication system in accordance with the present invention. In particular, a network management unit 200 is shown for managing a plurality of multiservice communication devices 125, each capable of communicating via a plurality of networks 107, 109, etc. In particular, management unit 200 communicates with each of the multiservice communication devices 125 via a logical control channel tunneled in and/or otherwise carried in conjunction with network data communicated between the multiservice communication devices 125 and the networks 107, 109, etc. Control data exchanged between the management unit 200 and each of the multiservice communication devices 125 can include remote control data that optionally include cognitive transceiver configuration data, and local control data.

In an embodiment of the present invention, management unit 200 gathers device identification data, such as an IP address, mobile identification number, MAC address or other device identifier corresponding to each of the multiservice communication devices 125 via local control data transmitted from each device to the management unit 200 via the logical control channel. Remote control data transmitted from the management unit 200 to a particular multiservice communication device 125 is addressed via device identifier for the particular device.

Further details regarding a possible implementation of management unit 200 are presented in conjunction with FIG. 21 that follows.

FIG. 21 is a schematic block diagram of an embodiment of a management unit in accordance with the present invention. In particular, a management unit 200 is shown that includes a management processing unit 270 and a network interface 272 that receives network resource data 280 from the plurality of networks, such as network 107, 109, etc. In operation, network interface 272 facilitates a bidirectional data communication with the plurality of multiservice communication devices 125 via a wireless control channel. The bidirectional data communication includes outbound control data 278, such as remote control data sent to at least one of the plurality of multiservice communication devices 125. The bidirectional data communication further includes inbound control data 276, such as local control data, received from at least one of the plurality of multiservice communication devices 125. As discussed in conjunction with FIG. 20, the wireless control channel can be implemented with a logical control channel that is carried by the communication between the plurality of multiservice communication devices 125 and one or more of the plurality of networks 107, 109, etc.

Management processing unit 270 can be implemented via at least one dedicated or shared processing device. Such a processing device, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the management processing unit 270 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In an embodiment of the present invention the network interface can include a modem, switch, router, network interface card, data interface or other interface that is capable if coupling to wireless networks 107, 109, etc. to send and receive inbound control data 276 and outbound control channel 278 via one or more of the networks 107, 109, etc. In addition, network interface 272 includes a control channel interface, a receiver, such as an environmental monitoring receiver, or other input device for receiving or generating network resource data that indicates the availability of network resources, such as frequency channels, time slots or other resources of networks 107, 109, etc.

Management processing unit 270 processes the inbound control data 276 and the network resource data 280 and generates the outbound control data 278 in response. The outbound control data 278 can include network connection data, transmit and receive parameters, protocol parameters, cognitive transceiver configuration data 260 or other control information to adapt or configure the multiservice communication devices 125 to operate with wireless networks 107, 109, etc. As discussed, the cognitive transceiver configuration data 260 can include receiver frequency band configuration data for configuring the frequency band of the receiver front-end; transmitter frequency band configuration data for configuring the frequency band of the transmitter front end; baseband processing configuration data for configuring at least one baseband processing parameter of the receiver baseband processing module; baseband processing application data for execution by the receiver baseband processing module; baseband processing configuration data for configuring at least one baseband processing parameter of the transmitter baseband processing module baseband processing application data for execution by the transmitter baseband processing module.

For example, the inbound control data 276 can include at least one transaction request, such as a request to download a file, to send a message, to view a video program, to place a telephone call, etc. The management processing unit 270 allocates at least one resource of at least one of the plurality of networks 107, 109, etc. based on the inbound control data and the network resource data. In an embodiment of the present invention, the management processing unit 270 selects one of the plurality of networks 107, 109, etc. to implement a transaction in accordance with the transaction request based on the inbound control data 276, that may further include device characteristics, device status parameters, further preferences, such as RF environmental data, battery remaining, desired quality of service, a latency preference, a cost preference, a device characteristic, a data rate preference. Management processing unit 270 selects one of the plurality of networks 107, 109, etc. also based on the network resource data 280 that provides information on which network resources are available to potentially service the request. The outbound control data 278 can include a selection of one of the plurality of networks 107, 109, etc along with other remote control data for adapting at least one transceiver of at least one of the plurality of multiservice communication devices.

FIG. 22 is a schematic block diagram of an embodiment of another communication system in accordance with the present invention. In particular, a network management unit 201 is shown for managing a plurality of multiservice communication devices 125, each capable of communicating via a plurality of networks 107, 109, etc. In particular, management unit 201 communicates with each of the multiservice communication devices 125 via a separate wireless control channel. Control data exchanged between the management unit 201 and each of the multiservice communication devices 125 can include remote control data that optionally include cognitive transceiver configuration data, and local control data.

In an embodiment of the present invention, management unit 201 gathers device identification data, such as an IP address, mobile identification number, MAC address or other device identifier corresponding to each of the multiservice communication devices 125 via local control data transmitted from each device to the management unit 201 via the physical control channel. Remote control data transmitted from the management unit 201 to a particular multiservice communication device 125 is addressed via device identifier for the particular device.

Further details regarding a possible implementation of management unit 201 are presented in conjunction with FIG. 23 that follows.

FIG. 23 is a schematic block diagram of another embodiment of a management unit in accordance with the present invention. In particular, management unit includes similar elements to management unit 200 that are referred to by common reference numerals. However, network interface 273 operates in a similar fashion to network interface 272 to generate or receive network resource data, however, inbound control data 276 and outbound control channel data 278 are communicated via a communication device interface, such as control channel transceiver 274. In operation, control channel transceiver, such as RF transceiver that is complementary to RF transceiver 123", facilitates a bidirectional data communication with the plurality of multiservice communication devices 125 via the wireless control channel.

FIG. 24 is a schematic block diagram of an embodiment of another communication system in accordance with the present invention. In particular a communication system is shown that shares similar elements to the communication system of FIG. 20 that are referred to by common reference numerals. In this embodiment however, management unit 200 includes a local agent 292 that gathers environmental data from remote devices 290 in communication with wireless network 107, and 109 and/or from multiservice communication devices 125. The remote devices 290 can include base stations, access points and other network devices, single service communication devices coupled to networks 107, 109, such as WLAN-enabled computers, wireless telephones or other devices in communication with wireless networks 107, 109, etc.

The environmental data can include RF spectral information and location data from each remote device 290 that is used by the management unit 200 to map the current RF environment to determine such factors as available channels, unused spectrum, used spectrum, sources and locations of noise and interference, locations of other "trouble zones" where communication via one or more channels of via one or more of the networks 107, 109, etc. can be difficult. Local agent 292 can operate to gather and process this information for use by management unit 200 to determine locations where handoffs will be required because a multiservice communication device is entering a trouble zone, to allocate frequency channels and other network resources and to otherwise generate other outbound control data 278, such as remote control data.

FIG. 25 is a schematic block diagram of another embodiment of a management unit in accordance with the present invention. In particular, a management unit 200 is shown that includes many similar elements described in conjunction with FIG. 21 that are referred to by common reference numerals. In addition, management processing unit 270 includes local agent 292, that can be implemented via hardware, firmware or software to gather environmental data via inbound data 276 from multiservice communication devices 125 and via other remote devices 290 that are part of or in communication with networks 107, 109, etc. As discussed, management processing unit 270 processes the inbound control data including the environmental data, and the network resource data and generate the outbound control data in response thereto.

In particular, local agent 292 can gather the environmental data from a plurality of remote devices, different from the plurality of multiservice communication devices, via the wireless control channel and/or from at least one of the plurality of multiservice communication devices via the wireless control channel.

FIG. 26 is a schematic block diagram of an embodiment of another communication system in accordance with the present invention. In particular a communication system is shown that shares similar elements to the communication system of FIG. 22 that are referred to by common reference numerals. In this embodiment however, management unit 201 includes a local agent 292 that gathers environmental data from remote devices 290, from networks 107, 109, etc. and/or from multiservice communication devices 125 via communication over a physical wireless control channel that can be implemented separate from the wireless networks 107, 109, etc. The remote devices 290 can include dedicated sensors configured to gather environmental data, or other devices in communication with management unit 201.

The environmental data can include RF spectral information, power measurements and location data from each remote device 290 that is used by the management unit 201 to map the current RF environment to determine such factors as available channels, unused spectrum, used spectrum, sources and locations of noise and interference, locations of other "trouble zones" where communication via one or more channels of via one or more of the networks 107, 109, etc. can be difficult. In addition, environmental data can optionally be collected by management unit 201 from one or more networks, such as network 107, 109, etc. Local agent 292 can operate to gather and process this information for use by management unit 201 to determine locations where handoffs will be required because a multiservice communication device is entering a trouble zone, to allocate frequency channels and other network resources and to otherwise generate other outbound control data 278, such as remote control data.

FIG. 27 is a schematic block diagram of another embodiment of a management unit in accordance with the present invention. In particular, a management unit 201 is shown that includes many similar elements described in conjunction with FIG. 23 that are referred to by common reference numerals. In addition, management processing unit 270 includes local agent 292, that can be implemented via hardware, firmware or software to gather environmental data via inbound data 276 from multiservice communication devices 125 and via other remote devices 290 that are part of or in communication with networks 107, 109, etc. In particular, local agent 292 can gather the environmental data from a plurality of remote devices, different from the plurality of multiservice communication devices, via the wireless control channel and/or from at least one of the plurality of multiservice communication devices via the wireless control channel. As discussed, management processing unit 270 processes the inbound control data 276, that includes the environmental data along with the network resource data 280 and generates the outbound control data in response thereto as previously described.

FIG. 28 is a schematic block diagram of an embodiment of a management network in accordance with the present invention. In particular, a hierarchical management unit network is presented for managing a plurality of multiservice communication devices capable of communicating via a plurality of networks. The management unit network includes a plurality of local management units 300, each of the plurality of local management units engaging in bidirectional data communication with at least one of the plurality of multiservice communication devices, such as communication device 125, via either a physical or logical wireless control channel. In a similar fashion to management units 200 and 201, local management units 300 each send outbound control data to, and receive inbound control data, from at least one of the plurality of multiservice communication devices. One or more regional management units are coupled to receive the inbound control data from the at least one of the plurality of local management units, for processing the inbound data to produce the outbound data and for sending the outbound data to the at least one of the plurality of local management units. In one embodiment, the local management units 300 are coupled to receive network resource data 280 from at least one of the plurality of networks, 107, 109, etc. and transmit the network resource data 280 to the regional management unit 302. In response, the regional management units 302 generate the outbound control data 276 further based on the network resource data 280. In another embodiment, the regional management units 302 are coupled to receive network resource data 280 from the plurality of networks, 107, 109, etc. An optional area management unit 304 is coupled to the region management units 302 for optionally participating in the production of the outbound data. The local management units 300 can also be coupled directly to networks 107, 109, etc to receive network resource data 280.

In operation, the functionality of the management units 201 or 200 is split among two or more layers of the hierarchical management network. Local tasks such as the communication of inbound control data 276 and outbound control data 278, the operation of a local agent for gathering and processing local environmental data is handled at the edge of the network. One or more of the processing functions, such as the allocation of network resources, the storage of cognitive transceiver configuration data, and the generation of other outbound control data 278 can be performed at either the regional management unit level or the optional area management unit level.

FIGS. 29 and 30 are schematic block diagrams of other embodiments of a management unit in accordance with the present invention. In particular, management units 300 and 300' operate in a similar fashion to management units 200 and 201. However, management units 300 and 300' each include a management layer interface 310 that can be a wired or wireless connection that is either direct or implemented through one or more networks, such as the Internet, to communicate with a complementary management layer interface 312 included in regional management unit 302. The management units 300 and 300' are each shown in an optional configuration whereby network resource data is collected by the local management units themselves. However, as discussed in conjunction with FIG. 28, the regional management units 302, via their own network interface that operates similarly to network interface 272, can likewise gather network resource data 280 directly from the corresponding networks 107, 109, etc. In addition, in the configuration shown in conjunction with FIG. 28 where the management unit network includes an area management unit 304, each of the regional management units 302 can further communicate with the area management unit 304 via the management layer interface 312.

As discussed in conjunction with FIG. 28, the functionality of the management units 201 or 200 is split among two or more layers of the hierarchical management network. Local tasks such as the communication of inbound control data 276 and outbound control data 278, the operation of a local agent for gathering and processing local environmental data is handled at the edge of the network in the local management units 300, via their management processing units 270. One or more of the processing functions, such as the allocation of network resources, the storage of cognitive transceiver configuration data, and the generation of other outbound control data 278 can be performed at either the regional management unit level or the optional area management unit level via management processing units 270 included in the regional management units 302 and/or via management processing units 270 included in the area management unit 304. In an embodiment of the present invention, the functionality discussed in conjunction with the management processing unit 270 of management units 200 and 201 can be distributed among the management processing units 270 at the local, regional and optional area layers of the management unit network.

FIG. 31 is a schematic block diagram of an embodiment of a processing module 225 in accordance with the present invention. In particular, processing module 225 of communication device 125 is shown to include a collaboration module 320, that can be implemented via hardware, software or firmware, depending on the implementation of processing module 225. In this embodiment, the management unit, such as management processing unit 200, 201, or management unit network generates the outbound control data 278 that is received by the collaboration module 320 to collaboratively establish at least one device setting of at least one of the plurality of multiservice communication devices 125.

In an embodiment of the present invention, the inbound control data 276 includes a transaction request and at least one suggested resource allocation generated by the collaboration module 320 and the management unit 200, 201 or the management unit network, allocates at least one resource of at least one of the plurality of networks 107, 109, etc. based on the inbound control data 276 and the network resource data 280. In another embodiment of the present invention, the inbound control data 276 includes a transaction request and at least one suggested network and the management unit 200, 201 or the management unit network, selects one of the plurality of networks 107, 109, etc. to implement a transaction in accordance with the transaction request based on the inbound control data 276 and the network resource data 280. These embodiments, the decision-making resides in the management unit 200, 201 or the management unit network. In this fashion, collaboration module 320, can generate suggested or recommended configurations based on its own analysis of local control data such as location, device characteristics, device preferences, user preferences, and the state of the device.

In other embodiments, the decision-making can reside in the collaboration module 320. For example, the management unit 200, 201 or the management unit network can generate outbound control data 278 that includes a recommended selection of one of the plurality of networks 107, 109, etc. and the collaboration module 320 can select one of the plurality of networks, 107, 109, etc. based on the recommended selection. In another example, the outbound control data 278 is generated to include recommended remote control data for adapting at least one transceiver of at least one of the plurality of multiservice communication devices and the collaboration module chooses whether to adapt the at least one transceiver, based on the recommended remote control data. In addition, the outbound control data 278 can include recommended cognitive transceiver configuration data 260 for configuring at least one cognitive transceiver of a multiservice communication device 125 and the collaboration module 320 chooses whether to configure the at least one cognitive transceiver. In this fashion, management unit 200 or 201, can generate suggested or recommended configurations based on its own analysis of local control data such as location, device characteristics, device preferences, user preferences, and the state of the device. In this fashion, collaboration module 320, can choose from suggested or recommended configurations based on its own analysis of local control data such as location, environment, noise and interference, spectral characteristics, device characteristics, device preferences, user preferences, and the state of the device.

FIG. 32 is a schematic block diagram of an embodiment of another communication system in accordance with the present invention. In particular a service aggregator 325 is shown for allocating network resources to a plurality of multiservice communication devices 125 capable of communicating via a plurality of networks 107, 109, etc. In an embodiment of the present invention the service aggregator is implemented in conjunction with a management unit 200 or 201 or a management unit network, such as the management unit network of FIG. 28.

In operation, the service aggregator engages in a bidirectional data communication with the plurality of multiservice communication devices, such as communication device 125, via a wireless control channel. The bidirectional data communication includes outbound control data, such as outbound control data 278 sent to the plurality of multiservice communication devices and inbound control data, such as inbound control data 276 received from the plurality of multiservice communication devices. Network resource data is gathered from the plurality of networks. A management processing unit, such as management processing unit 270, processes the inbound control data and the network resource data and generates the outbound control data in response thereto, wherein the inbound control data includes at least one transaction request and the service aggregator allocates at least one resource of at least one of the plurality of networks based on the inbound control data and the network resource data.

For example, a communication device 125 can, via the wireless control channel, send a request to send a telephone call. The service aggregator 325 locates an available network and sends outbound control data 278 to the communication device 125 to communication with the network. The outbound control data can include cognitive transceiver configuration data 260 that configures a cognitive transceiver of the communication device 125 to communicate with the chosen network to place the call.

In another example, the communication device 125, while operating as a web browser locates a broadcast video program of interest that is not available via the web. The communication device 125 uses a logical control channel carried via an IP protocol to contact the service aggregator to request access to the broadcast video program. The service aggregator locates a local broadcaster, based on location data provided by communication device 125 via inbound control data 276. Service aggregator downloads baseband processing data to be executed by the receiver processing module and the transmitter processing module of a cognitive transceiver of communication device 125 along with specific channel information that will allow the cognitive receiver to tune to, receive and decode the video broadcast.

These examples merely illustrate the wide range of transactions possible in accordance with the broad scope of the present invention.

FIG. 33 is a schematic block diagram of an embodiment of another communication system in accordance with the present invention. In this embodiment, management unit 200 engages in bidirectional data communication with the plurality of multiservice communication devices 125 via a logical control channel, the bidirectional data communication including outbound control data sent to at least one of the plurality of multiservice communication devices and inbound control data received from at least one of the plurality of multiservice communication devices. In this example, the wireless control channel is carried by the communication between the plurality of multiservice communication devices 125 and the plurality of networks 107, 109, etc.

The management unit 200 processes the inbound control data along with network resource data received from the networks 107, 109, etc. and generates the outbound control data in response thereto. In operation, the management unit 200, via a corresponding management processing unit, such as management processing unit 270, facilities the handoff of a real-time service provided by real-time service provider 330 from one network, such as network 107 to a second network such as network 109. While a single service provider 330 is shown, management unit 200 can similarly be implemented to facilities the handoff for multiple service providers.

For example, the real-time service can be a telephone call, a game, an audio playback, a video playback, a file download, a multimedia application or other real-time service or application. In operation, the management unit 200, via management processing unit 270, detects a potential handoff condition via inbound control data, such a deterioration of performance, possible motion into a trouble zone, a failure of network resources, a change of service is desired such as when a higher data rate service is available or other condition. In response, the management unit 200 via management processing unit 270, selects the second network based on one or more of: RF environmental data, battery remaining, desired quality of service, a latency preference, a cost preference, a device characteristic, a data rate preference and transmits this selection to communication device 125 via the outbound control data 278.

In an embodiment of the present invention, the management unit 200 via management processing unit 270, facilitates the establishment of a connection between the communication device 125, prior to the handoff of the real-time service, based on the outbound control data 278 sent prior to the handoff of the real-time service. For example, management unit 200 can transmit outbound control data 278 that includes cognitive transceiver configuration data for configuring at least one cognitive transceiver of at least one of the plurality of multiservice communication devices in accordance with the second network. In this fashion, the communication device 125 can configure itself for communication with the second network.

In an embodiment of the present invention, the user of communication device 125 is engaged in a telephone call via wireless network 107 which is a GSM-based mobile telephony network, coupled to a public switched telephone network, and serviced via real-time service provider 330. When management unit 200 detects, based on location data from the communication device 125, that the communication device 125 is coming in range of the user's home where wireless network 109, in this case home wireless network, management unit prepares a handoff to network 109. In particular, management unit 201 transfers cognitive transceiver configuration data 260 or other outbound control data 276 to the communication device 125 to configure the communication device to communicate with wireless network 109.

When, based on inbound control data 276, the management unit 201 detects via inbound control data 276 that the communication device 125 has configured its cognitive radio transceiver and is in range of the wireless network 109, the management unit 201 negotiates the handoff the call via IP protocol communications with real-time service provider 330 from network 107 to wireless network 109. In particular, management unit 201 provides the IP address of the communication device 109 along with GSM device identifiers to real-time service provider 330, who places the call on wireless network 107 on-hold or terminates the mobile call, while transferring the call to a voice-over-IP call accessed via communication device 125 via network 109.

FIG. 34 is a schematic block diagram of an embodiment of another communication system in accordance with the present invention. In particular a communication system is presented that functions in a similar fashion to the communication system of FIG. 33. In this embodiment however, control data exchanged between a communication device 125 and the management unit 201 via a separate physical control channel. As described in conjunction with FIG. 33, management unit 201 communicates control data to facilitate the handoff of a real-time service from real-time service provider 330 from network 107 to 109. This facilitation can include the establishment of the provision of the real-time service via the network 109, prior to the handoff. This facilitation can further include the adaption or configuration of one or more transceivers of communication device 125 for communication with the network 109.

FIG. 35 is a flow chart of an embodiment of a method in accordance with the present invention. In particular, a method is presented for use in conjunction with one or more of the functions and features described in conjunction with FIGS. 1-34. The method begins by wirelessly transceiving data via a plurality of transceivers with a corresponding plurality of networks in accordance with a plurality of network protocols as shown in step 400. In step 402, signals received from an environmental monitoring receiver over a broadband spectrum are processed to generate environmental data. In step 404, the environmental data is processed to generate at least one control signal for adapting at least one of the plurality of transceivers.

FIG. 36 is a flow chart of an embodiment of a method in accordance with the present invention. In particular, a method is presented for use in conjunction with one or more of the functions and features described in conjunction with FIGS. 1-35. In step 410, data via a plurality of transceivers are wirelessly transceived with a corresponding plurality of networks in accordance with a plurality of network protocols. In step 412, signals received from one of the a plurality of transceivers, configured as an environmental monitoring receiver in a environmental monitoring mode of operation, are processed over a broadband spectrum to generate environmental data. In step 414, the environmental data are processed to generate at least one control signal for adapting at least one of the plurality of transceivers.

FIG. 37 is a flow chart of an embodiment of a method in accordance with the present invention. In particular, a method is presented for use in conjunction with one or more of the functions and features described in conjunction with FIGS. 1-36. In step 420, data is wirelessly transceived via a plurality of transceivers with a corresponding plurality of networks in accordance with a plurality of network protocols. In step 422, signals are transceived via a control channel transceiver with a remote management unit including local control data and remote control data. In step 424, the remote control data are processed to generate at least one control signal for adapting at least one of the plurality of transceivers.

FIG. 38 is a flow chart of an embodiment of a method in accordance with the present invention. In particular, a method is presented for use in conjunction with one or more of the functions and features described in conjunction with FIGS. 1-37. In step 430, data are wirelessly transceived via a plurality of transceivers with a corresponding plurality of networks in accordance with a plurality of network protocols, wherein one of the a plurality of transceivers is configured as a control channel transceiver for transceiving signals via a control channel receiver with a remote management unit in a control channel mode of operation. The signals include both local control data and remote control data. In step 432, the remote control data are processed to generate at least one control signal for adapting at least one of the plurality of transceivers.

FIG. 39 is a flow chart of an embodiment of a method in accordance with the present invention. In particular, a method is presented for use in conjunction with one or more of the functions and features described in conjunction with FIGS. 1-38. In step 440, network data are wirelessly transceived via a plurality of transceivers with a corresponding plurality of networks in accordance with a plurality of network protocols, wherein one of the a plurality of transceivers further transceives control channel data with a remote management unit contemporaneously with the network data via a logical control channel carried using a corresponding one of the plurality of network protocols, the control data including local control data and remote control data. In step 442, the remote control data are processed to generate at least one control signal for adapting at least one of the plurality of transceivers.

FIG. 40 is a flow chart of an embodiment of a method in accordance with the present invention. In particular, a method is presented for use in conjunction with one or more of the functions and features described in conjunction with FIGS. 1-39. In step 450, network data are wirelessly transceived via a plurality of transceivers with a corresponding plurality of networks in accordance with a plurality of network protocols, wherein one of the a plurality of transceivers further transceives control channel data with a remote management unit via a logical control channel embedded in the network data transceived with a corresponding one of the plurality of networks, the control data including local control data and remote control data. In step 452, the remote control data are processed to generate at least one control signal for adapting at least one of the plurality of transceivers.

FIG. 41 is a flow chart of an embodiment of a method in accordance with the present invention. In particular, a method is presented for use in conjunction with one or more of the functions and features described in conjunction with FIGS.

1-40. In step 460, network data are wirelessly transceived via a plurality of transceivers with a corresponding plurality of networks in accordance with a plurality of network protocols via a multiservice communication device, wherein at least one of the plurality of transceivers includes a cognitive radio transceiver. Step 462 continues by receiving cognitive transceiver configuration data from a management unit in communication with the multiservice communication device, via a control channel. In step 464, at least one cognitive radio transceiver is configured based on the cognitive transceiver configuration data.

FIG. 42 is a flow chart of an embodiment of a method in accordance with the present invention. In particular, a method is presented for use in conjunction with one or more of the functions and features described in conjunction with FIGS. 1-41. The method includes processing the cognitive transceiver configuration data to generate at least one control signal in response thereto, as shown in step 470.

FIG. 43 is a flow chart of an embodiment of a method in accordance with the present invention. In particular, a method is presented for use in conjunction with one or more of the functions and features described in conjunction with FIGS. 1-42. In step 480, the first cognitive radio transceiver is configured to implement the control channel.

FIG. 44 is a flow chart of an embodiment of a method in accordance with the present invention. In particular, a method is presented for use in conjunction with one or more of the functions and features described in conjunction with FIGS. 1-43. In step 490, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices. In step 492, network resource data are received from a plurality of networks. In step 494, the inbound control data and the network resource data are processed to generate the outbound control data in response thereto.

FIG. 45 is a flow chart of an embodiment of a method in accordance with the present invention. In particular, a method is presented for use in conjunction with one or more of the functions and features described in conjunction with FIGS. 1-44. Step 500 begins the method by, engaging in a bidirectional data communication between a plurality of local management units and a plurality of multiservice communication devices via a wireless control channel, the bidirectional data communication including outbound control data sent to at least one of the plurality of multiservice communication devices and inbound control data received from at least one of the plurality of multiservice communication devices. In step 502, the inbound control data are received at a first regional management unit. In step 504, the inbound control data are processed to generate the outbound control data in response thereto.

FIG. 46 is a flow chart of an embodiment of a method in accordance with the present invention. In particular, a method is presented for use in conjunction with one or more of the functions and features described in conjunction with FIGS. 1-45. In step 510, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices, wherein the wireless control channel is separate from the communication between the plurality of multiservice communication devices and the plurality of networks. In step 512, network resource data is received from a plurality of networks. In step 514, the inbound control data and the network resource data are processed to generate the outbound control data in response thereto. The inbound control data includes at least one transaction request and allocating at least one network resources of the plurality of networks based on the inbound control data and the network resource data.

FIG. 47 is a flow chart of an embodiment of a method in accordance with the present invention. In particular, a method is presented for use in conjunction with one or more of the functions and features described in conjunction with FIGS. 1-46. In step 520, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices, wherein the wireless control channel is carried by the communication between the plurality of multiservice communication devices and the plurality of networks. In step 522, network resource data is received from a plurality of networks. In step 524, the inbound control data and the network resource data are processed to generate the outbound control data in response thereto, wherein the inbound control data includes at least one transaction request and allocating at least one network resources of the plurality of networks based on the inbound control data and the network resource data.

FIG. 48 is a flow chart of an embodiment of a method in accordance with the present invention. In particular, a method is presented for use in conjunction with one or more of the functions and features described in conjunction with FIGS. 1-47. In step 530, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices, wherein the wireless control channel is separate from the communication between the plurality of multiservice communication devices and the plurality of networks. In step 532, network resource data are received from a plurality of networks. In step 534, the inbound control data and the network resource data are processed to generate the outbound control data in response thereto to facilitate the handoff of a real-time service accessed by the at least one of the plurality of multiservice communication devices via a first network of the plurality of networks to a second network of the plurality of networks.

FIG. 49 is a flow chart of an embodiment of a method in accordance with the present invention. In particular, a method is presented for use in conjunction with one or more of the functions and features described in conjunction with FIGS. 1-48. In step 540, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices, wherein the wireless control channel is carried by the communication between the plurality of multiservice communication devices and the plurality of networks. In step 542, network resource data are received from a plurality of networks. In step 544, the inbound control data and the network resource data are processed to generate the outbound control data in response thereto to facilitate the handoff of a real-time service accessed by the at least one of the plurality of multiservice communication devices via a first network of the plurality of networks to a second network of the plurality of networks.

FIG. 50 is a flow chart of an embodiment of a method in accordance with the present invention. In particular, a method is presented for use in conjunction with one or more of the functions and features described in conjunction with FIGS. 1-49. In step 550, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices, wherein the wireless control channel is separate from the communication between the plurality of multiservice communication devices and the plurality of networks. In step 552, network resource data are received from a plurality of networks. In step 554, the inbound control data and the network resource data are processed to generate the outbound control data in response thereto to collaboratively establish at least one device setting of at least one of the plurality of multiservice devices via a collaboration module.

FIG. 51 is a flow chart of an embodiment of a method in accordance with the present invention. In particular, a method is presented for use in conjunction with one or more of the functions and features described in conjunction with FIGS. 1-50. In step 560, a bidirectional data communication is facilitated with a plurality of multiservice communication devices via a wireless control channel, the bidirectional data communication including outbound control data sent to at least one of the plurality of multiservice communication devices and inbound control data received from at least one of the plurality of multiservice communication devices, wherein the wireless control channel is carried by the communication between the plurality of multiservice communication devices and the plurality of networks. In step 562, network resource data are received from a plurality of networks. In step 564, the inbound control data and the network resource data are processed to generate the outbound control data in response thereto to collaboratively establish at least one device setting of at least one of the plurality of multiservice devices via a collaboration module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A multiservice communication device comprising:
 a plurality of transceivers that wirelessly transceive data with a corresponding plurality of networks in accordance with a corresponding plurality of network protocols;
 a control channel transceiver that transceives control channel data with a remote management unit including local control data sent to the management unit and remote control data received from the management unit, wherein the remote management unit is coupled to receive network resource data from the plurality of networks and generates the remote control data based on the local control data and the network resource data from the plurality of networks; and
 a processing module, coupled to the plurality of transceivers and the control channel transceiver, that processes the remote control data and generates at least a least one control signal in response thereto, the at least one control signal for adapting at least one of the plurality of transceivers based on the remote control data;

wherein the plurality of transceivers includes at least one cognitive radio transceiver that is configured based on cognitive transceiver configuration data received via the control channel data.

2. The multiservice communication device of claim 1 wherein the local control data includes at least one of: RF environmental data, battery remaining, desired quality of service, a latency preference, a cost preference, a transaction request, a device characteristic, a data rate preference.

3. The multiservice communication device of claim 1 wherein the at least one control signal for adapting at least one of the plurality of transceivers controls a communication hand off of the multiservice communication device from a first network to a second network.

4. The multiservice communication device of claim 1 wherein the at least one control signal for adapting at least one of the plurality of transceivers changes a frequency channel used by at least one of the plurality of transceivers.

5. The multiservice communication device of claim 1 wherein the at least one control signal for adapting at least one of the plurality of transceivers modifies a transmission parameter of at least one of the plurality of transceivers.

6. The multiservice communication device of claim 1 wherein the at least one control signal for adapting at least one of the plurality of transceivers modifies a receive parameter of at least one of the plurality of transceivers.

7. The multiservice communication device of claim 1 wherein the corresponding plurality of network protocols includes at least one of: a 802.11 protocol, a WIMAX protocol, a Bluetooth protocol, a wireless HDMI protocol, a 60 GHz piconet protocol, a cellular data protocol, and a cellular voice protocol.

8. The multiservice communication device of claim 1 further comprising:
a location generation module, coupled to the control channel transceiver, that generates location data and wherein the local control data includes the location data.

9. The multiservice communication device of claim 8 wherein the location generation module includes a global positioning system receiver.

10. The multiservice communication device of claim 1 wherein the processing module generates at least a portion of the local control data.

11. The multiservice communication device of claim 1 wherein at least one of the plurality of transceivers includes a cognitive radio transceiver that is configured based on the remote control data.

12. The multiservice communication device of claim 1 wherein the control data is transceived in accordance with a control channel protocol that differs from the corresponding plurality of network protocols.

13. A multiservice communication device comprising:
a plurality of transceivers that wirelessly transceive data with a corresponding plurality of networks in accordance with a corresponding plurality of network protocols;
wherein at least one of the plurality of transceivers, in a control channel mode of operation, transceives control channel data with a remote management unit including local control data sent to the management unit and remote control data received from the management unit, wherein the remote management unit is coupled to receive network resource data from the plurality of networks and generates the remote control data based on the local control data and the network resource data from the plurality of networks, wherein the local control data includes at least one of: desired quality of service, a latency preference, a cost preference, a transaction request, and a data rate preference; and
a processing module, coupled to the plurality of transceivers, that processes the remote control data and generates a least one control signal in response thereto, the at least one control signal for adapting at least one of the plurality of transceivers based on the remote control data;
wherein the plurality of transceivers includes at least one cognitive radio transceiver that is configured based on cognitive transceiver configuration data received via the control channel data.

14. The multiservice communication device of claim 13 wherein the at least one control signal for adapting at least one of the plurality of transceivers controls a communication hand off of the multiservice communication device from a first network to a second network.

15. The multiservice communication device of claim 13 wherein the at least one control signal for adapting at least one of the plurality of transceivers changes a frequency channel used by at least one of the plurality of transceivers.

16. The multiservice communication device of claim 13 wherein the at least one control signal for adapting at least one of the plurality of transceivers modifies a transmission parameter of at least one of the plurality of transceivers.

17. The multiservice communication device of claim 13 wherein the at least one control signal for adapting at least one of the plurality of transceivers modifies a receive parameter of at least one of the plurality of transceivers.

18. The multiservice communication device of claim 13 wherein the corresponding plurality of network protocols includes at least one of: a 802.11 protocol, a WIMAX protocol, a Bluetooth protocol, a wireless HDMI protocol, a 60 GHz piconet protocol, a cellular data protocol, and a cellular voice protocol.

19. The multiservice communication device of claim 13 further comprising:
a location generation module, coupled to the control channel transceiver, that generates location data and wherein the local control data includes the location data.

20. The multiservice communication device of claim 19 wherein the location generation module includes a global positioning system receiver.

21. The multiservice communication device of claim 13 wherein the processing module generates at least a portion of the local control data.

22. The multiservice communication device of claim 13 wherein the at least one of the plurality of transceivers includes a cognitive radio transceiver that is configured based on the remote control data.

23. The multiservice communication device of claim 13 wherein the plurality of transceivers includes a plurality of cognitive radio transceivers that are configured based on the remote control data.

24. The multiservice communication device of claim 13 wherein the control data is transceived in accordance with a control channel protocol that differs from the corresponding plurality of network protocols.

* * * * *

UNITED STATES PATENT AND TRADEMARK OFFICE
CERTIFICATE OF CORRECTION

| | | |
|---|---|---|
| PATENT NO. | : 8,521,222 B2 | Page 1 of 1 |
| APPLICATION NO. | : 12/264379 | |
| DATED | : August 27, 2013 | |
| INVENTOR(S) | : Vinko Erceg et al. | |

It is certified that error appears in the above-identified patent and that said Letters Patent is hereby corrected as shown below:

In the Claims

Col. 34, line 9, in claim 13: replace "a least" with --at least--

Signed and Sealed this
First Day of July, 2014

Michelle K. Lee
*Deputy Director of the United States Patent and Trademark Office*